United States Patent
Park et al.

(10) Patent No.: US 10,637,804 B2
(45) Date of Patent: Apr. 28, 2020

(54) USER TERMINAL APPARATUS, COMMUNICATION SYSTEM, AND METHOD OF CONTROLLING USER TERMINAL APPARATUS WHICH SUPPORT A MESSENGER SERVICE WITH ADDITIONAL FUNCTIONALITY

(71) Applicant: SAMSUNG ELECTRONICS CO., LTD., Suwon-si (KR)

(72) Inventors: Kyung-eun Park, Suwon-si (KR); Kyu-ho Kim, Seongnam-si (KR); Chul-seung Kim, Seoul (KR); Myung-hee Han, Pyeongtaek-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 670 days.

(21) Appl. No.: 14/727,275

(22) Filed: Jun. 1, 2015

(65) Prior Publication Data
US 2015/0350123 A1   Dec. 3, 2015

(30) Foreign Application Priority Data
May 31, 2014   (KR) .......................... 10-2014-0066592

(51) Int. Cl.
*H04L 12/58*   (2006.01)
*G06F 3/0484*   (2013.01)
(Continued)

(52) U.S. Cl.
CPC ............ *H04L 51/04* (2013.01); *G06F 3/0484* (2013.01)

(58) Field of Classification Search
CPC combination set(s) only.
See application file for complete search history.

(56) References Cited

U.S. PATENT DOCUMENTS 7,287,057 B2 * 10/2007 Lagarde .................. H04L 51/04
                                                       709/204
7,549,924 B2 *  6/2009 Canessa .................. A63F 13/12
                                                         463/40
(Continued)

FOREIGN PATENT DOCUMENTS

KR   1020110124406 A   11/2011
KR   1020130050871 A    5/2013
(Continued)

*Primary Examiner* — Ryan Barrett
*Assistant Examiner* — Haimei Jiang
(74) *Attorney, Agent, or Firm* — Sughrue Mion, PLLC

(57) ABSTRACT

A user terminal apparatus including: a display configured to provide a messenger service image of a messenger service; a user interface unit user interface configured to receive user interaction with respect to the messenger service image; and a processor configured to control the user terminal apparatus to transmit, in response to a user command for execution of an application being input in the messenger service image, identifier information of corresponding to the application and participant information corresponding to participants of the messenger service image to an app application providing server in response to a user command for app execution in the messenger service image being input, and to control the user terminal apparatus to receive app application execution information configured based on the participant information from the app application providing server, and to provide the app application execution information as an input message of the messenger service.

26 Claims, 22 Drawing Sheets

(51) Int. Cl.
    *G06F 3/0481*     (2013.01)
    *G06F 3/0482*     (2013.01)

(56) References Cited

U.S. PATENT DOCUMENTS

| | | | | |
|---|---|---|---|---|
| 2003/0079024 | A1* | 4/2003 | Hough | G06Q 10/10 |
| | | | | 709/227 |
| 2004/0205772 | A1* | 10/2004 | Uszok | H04L 29/06 |
| | | | | 719/317 |
| 2004/0224772 | A1* | 11/2004 | Canessa | A63F 13/12 |
| | | | | 463/42 |
| 2007/0124381 | A1* | 5/2007 | Zurko | G06Q 10/10 |
| | | | | 709/205 |
| 2013/0159826 | A1* | 6/2013 | Mason | G06F 17/2247 |
| | | | | 715/205 |
| 2013/0182131 | A1* | 7/2013 | Naono | H04N 5/76 |
| | | | | 348/207.1 |
| 2013/0332543 | A1* | 12/2013 | Shin | H04L 51/32 |
| | | | | 709/206 |
| 2014/0068467 | A1* | 3/2014 | Van | G06Q 10/107 |
| | | | | 715/758 |
| 2015/0302470 | A1* | 10/2015 | Dru | G06Q 30/0277 |
| | | | | 705/14.51 |

FOREIGN PATENT DOCUMENTS

| | | | |
|---|---|---|---|
| KR | 1020130139468 A | 12/2013 | |
| KR | 1020140015692 A | 2/2014 | |

\* cited by examiner

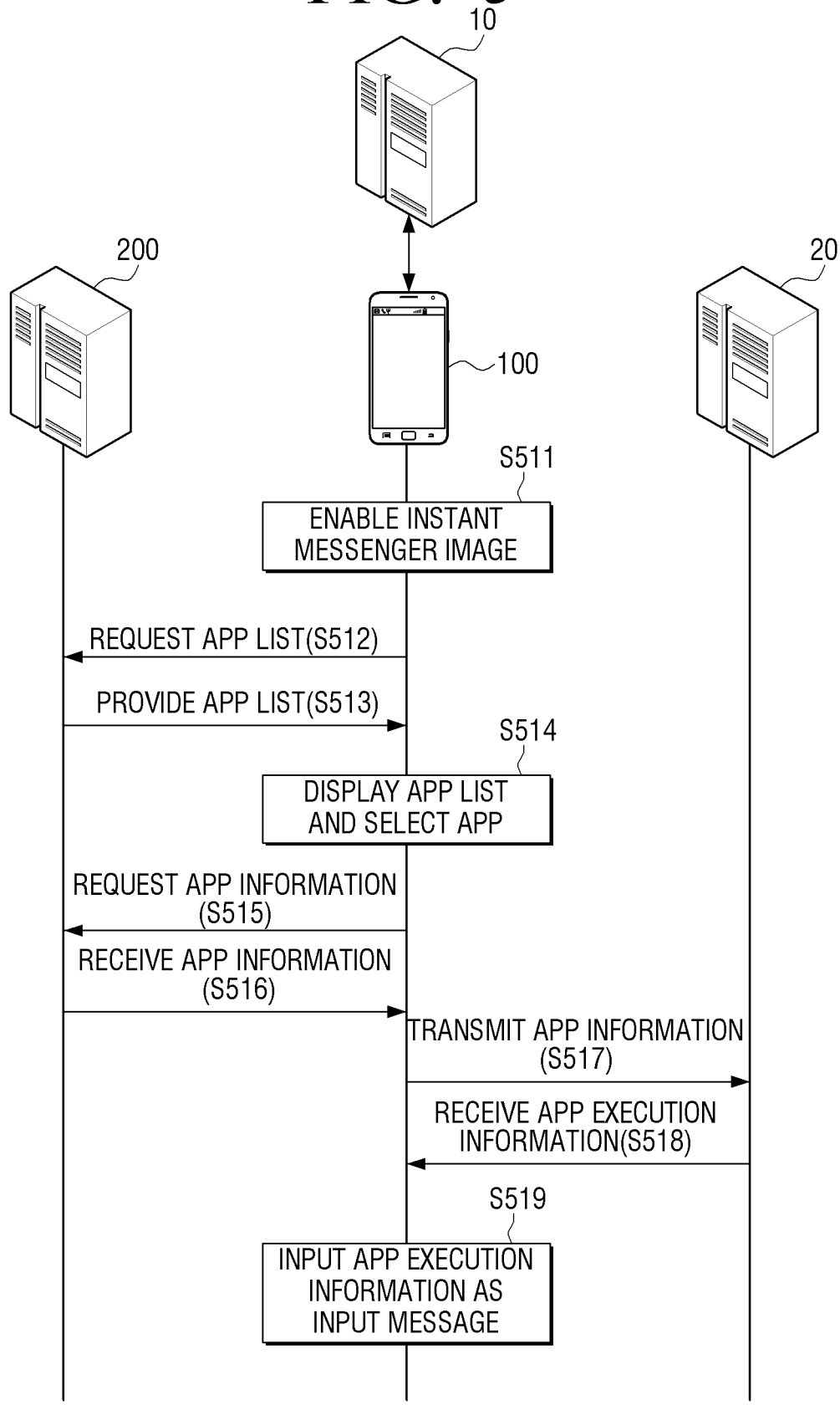

FIG. 6A
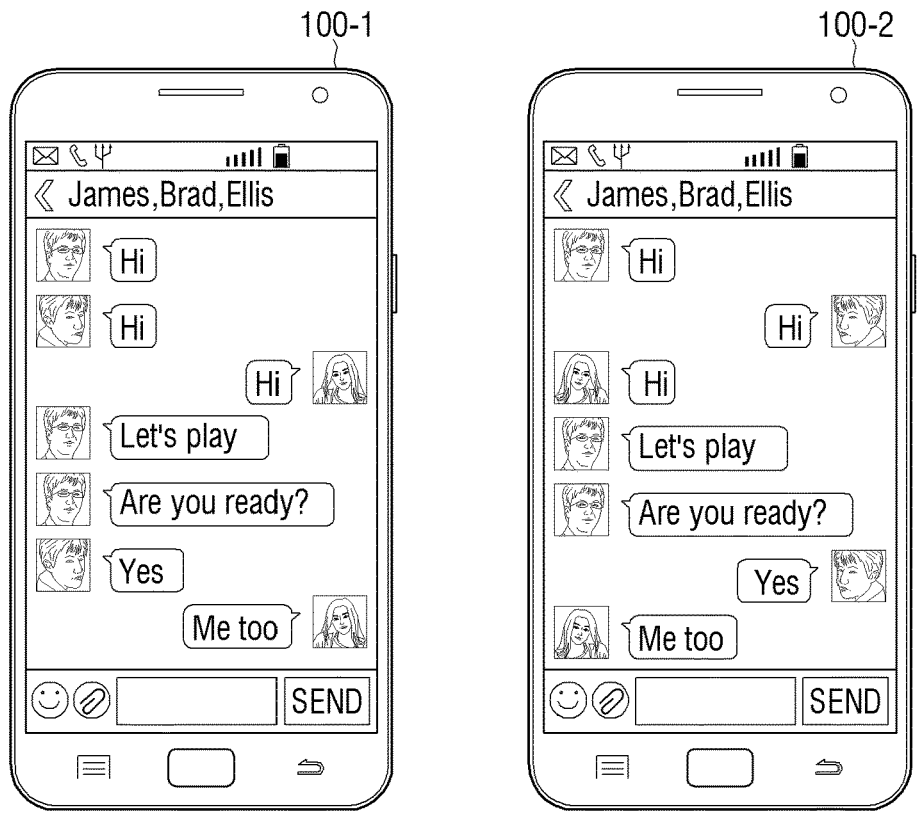
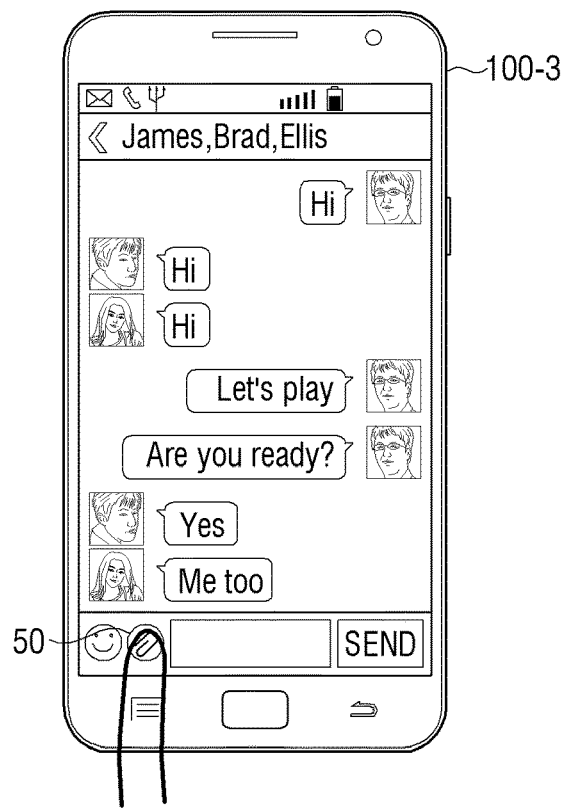

FIG. 6B
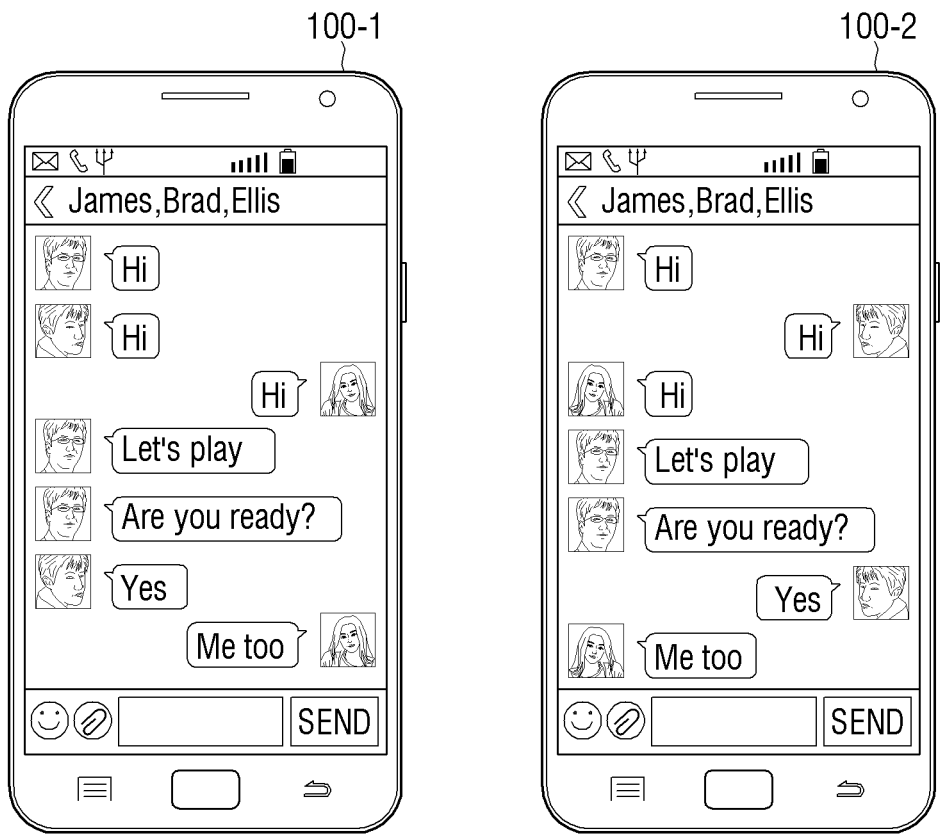
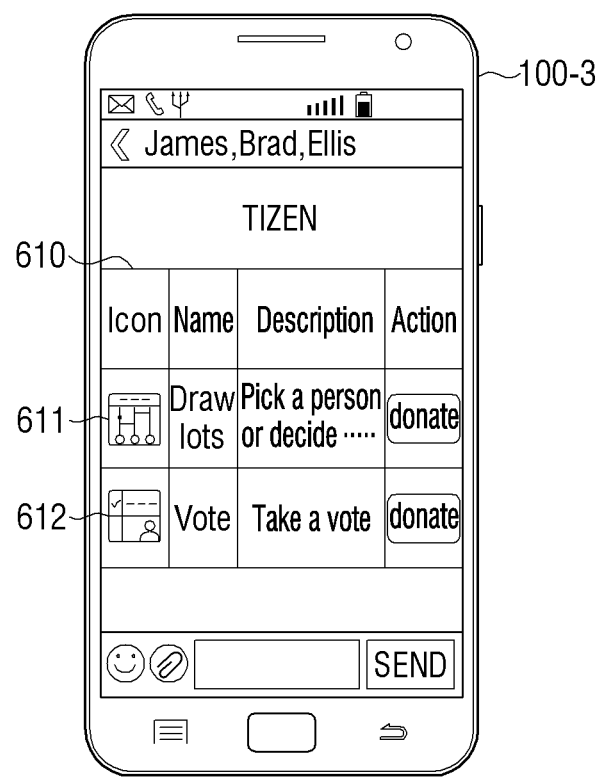

FIG. 7A
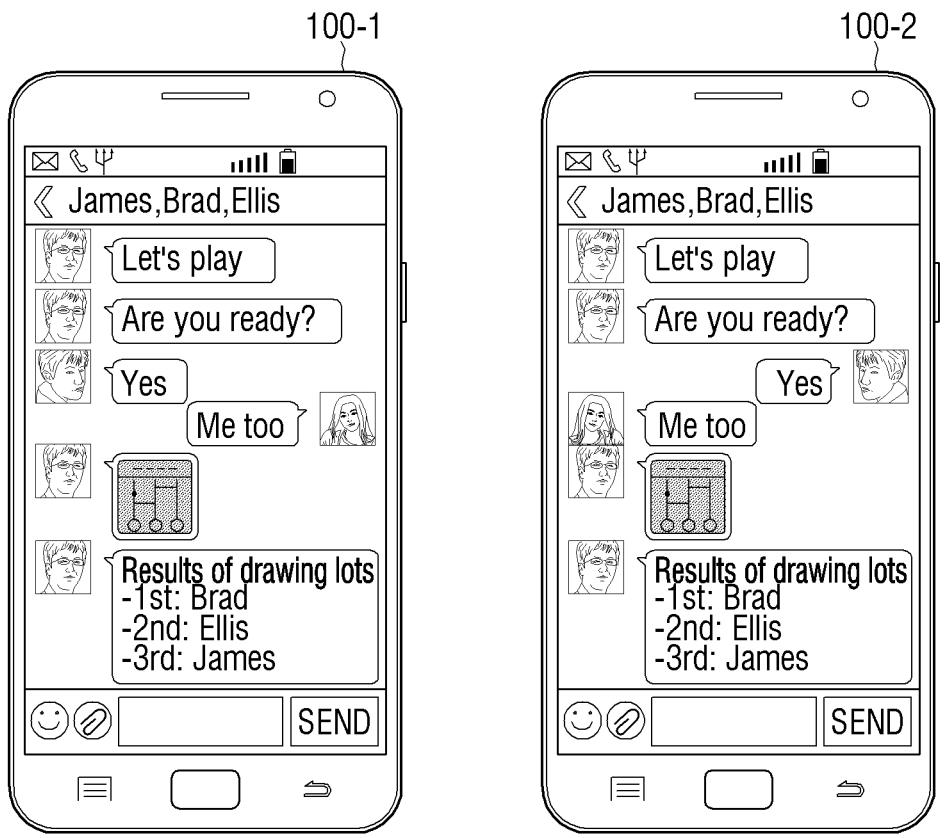
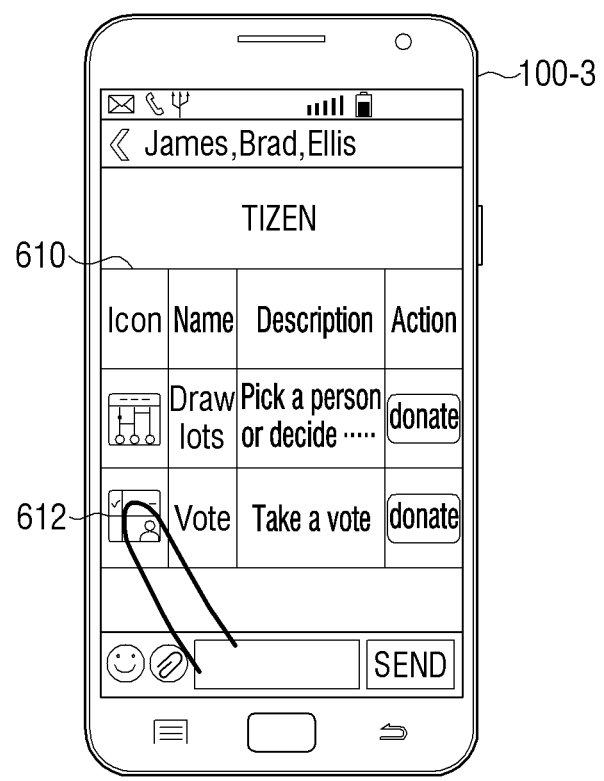

USER TERMINAL APPARATUS, COMMUNICATION SYSTEM, AND METHOD OF CONTROLLING USER TERMINAL APPARATUS WHICH SUPPORT A MESSENGER SERVICE WITH ADDITIONAL FUNCTIONALITY

CROSS-REFERENCE TO RELATED APPLICATIONS

This application claims priority from Korean Patent Application No. 10-2014-0066592, filed on May 31, 2014, in the Korean Intellectual Property Office, the disclosure of which is incorporated herein by reference in its entirety.

BACKGROUND

1. Field

Apparatuses and methods consistent with aspects of one or more exemplary embodiments relate to a user terminal apparatus, a communication system, and a method of controlling the user terminal apparatus, and more particularly, to a user terminal apparatus for supporting a messenger service, a communication system, and a method of controlling the user terminal apparatus.

2. Description of the Related Art

In general, a legacy instant messenger refers to software or hardware that enables two or more users to transmit text or a text image in real time, and enables a user to register conversation companions and to transmit and receive message to and from a companion from a conversation companion list output to a messenger screen. Use of a legacy instant messenger has been provided in a mobile communication terminal as well as in a personal computer (PC).

However, legacy instant messengers may only be able to provide limited content, such as a text, an image, and so on, which may degrade utilization of the legacy instant messenger.

SUMMARY

One or more exemplary embodiments overcome the above disadvantages and other disadvantages not described above. Also, one or more exemplary embodiments are not required to overcome the disadvantages described above, and an exemplary embodiment may not overcome any of the problems described above.

According to an aspect of one or more exemplary embodiments, there is provided a communication system, and a method of controlling the user terminal apparatus for providing an app execution image, to enable real-time interaction in a legacy instant messenger service.

According to an aspect of one or more exemplary embodiments, there is provided a user terminal apparatus including: a display configured to provide a messenger service image of a messenger service; a user interface configured to receive user interaction with respect to the messenger service image; and a processor configured to control the user terminal apparatus to transmit, in response to a user command for execution of an application being input in the messenger service image, identifier information corresponding to the application and participant information corresponding to participants of the messenger service to an application providing server, to control the user terminal apparatus to receive application execution information configured based on the participant information from the application providing server, and to provide the application execution information as an input message of the messenger service.

The processor may be further configured to control the user terminal apparatus to receive an application list from an application management server, to control the display to display the application list in response to a preset event, and to control the user terminal apparatus to transmit, in response to a user command selecting one application from the application list, identifier information corresponding to the one application and the participant information to the application providing server.

The processor may be further configured to control the user terminal apparatus to communicate with the application providing server and the application management server through pre-installed application launcher software.

The preset event may include receiving a user command selecting a present item provided in the messenger service image.

The user command for execution of the application may include a user input of information identifying the application in a chat window of the messenger service.

The processor may be further configured to control the display to display an icon corresponding to the application in a chat window of the messenger service based on the received application execution information.

The processor may be further configured to automatically execute, in response to the received application execution information being provided as the input message, the application.

The processor may be further configured to execute the application according to a user command selecting the icon provided in the chat window.

The application execution information received from the application providing server may include application configuration information for configuring an application execution image for receiving real-time interaction by a participant of the messenger service image.

The processor may be further configured to control the user terminal apparatus to receive an application use result corresponding to the real-time interaction by the participant of the messenger service image, and to provide the application use result as an input message of the messenger service.

The processor may be further configured to control, in response to application being executed, the display to display an application execution image as the messenger service image, and to control, in response to application being terminated, the display to restore the messenger service image to a previous image.

The application may be a web application.

The application management server may manage Uniform Resource Locator (URL) information and an execution command of the web application.

The application providing server may manage a resource and code of the web application corresponding to URL information.

According to another aspect of one or more exemplary embodiments, there is provided a communication system including: an application management server configured to manage information of a web application executable in a messenger service image of a messaging service; and a user terminal apparatus configured to, in response to a user command for execution of the web application being input in the messenger service image, acquire information corresponding to the web application, to transmit the acquired information and participant information corresponding to participants of the messenger service to an application providing server, to receive application execution information based on the participant information, and to provide, in response to the application execution information being received, the received application execution information as an input message of the messenger service According to another aspect of one or more exemplary embodiments, there is provided a method of controlling a user terminal apparatus, the method including: displaying a messenger service image of a messenger service; transmitting, in response to a user command for execution of an application being input in the messenger service image, identifier information corresponding to the application and participant information corresponding to participants of the messenger service to an application providing server; receiving application execution information configured based on the participant information from the application providing server; and providing the application execution information as an input message of the messenger service.

The method may further include: receiving an application list from an application management server; and displaying the application list in response to a preset event.

The transmitting may include transmitting, in response to a user command selecting one application from the application list, identifier information corresponding to the one application and the participant information to the application providing server.

The user terminal apparatus may communicate with the application providing server and the application management server through pre-installed application launcher software.

The preset event may include an event of receiving a user command selecting a present item provided in the messenger service image.

The user command for execution of the application may include a user input of information identifying the application in a chat window of the messenger service.

The method may further include providing an icon corresponding to the application in a chat window of the messenger service based on the received application execution information.

The method may further include automatically executing, in response to the received application execution information being provided as the input message, the application.

The method may further include executing the application according to a user command selecting the icon provided in the chat window.

The application execution information received from the application providing server may include application configuration information for configuring an application execution image for receiving real-time interaction by a participant of the messenger service image According to an aspect of one or more exemplary embodiments, there is provided the present invention, a user terminal apparatus including: a display; a communicator; and a controller configured to: execute a messenger service, control the display to display a messenger service image of the messenger service, control the communicator to transmit identifier information corresponding to a web application and participant information corresponding to users of the messenger service to an application providing server, control the communicator to receive application execution information based on the participant information from the application providing server, and provide the application execution information as an input message to the messenger service.

The controller may be further configured to, in response to the application execution information being provided as an input message to the messenger service, control the display to display an icon corresponding to the web application in a chat window of the messaging service image.

The controller may be further configured to control the communicator to receive an application result corresponding to an execution of the web application, and to provide the application result as an input message of the messenger service.

The web application may include an application requesting user input from the users of the messaging service.

The controller may be further configured to control the communicator to receive an application result corresponding to the user input, and to provide the application result as an input message of the messenger service.

As described above, according to various exemplary embodiments, there is provided an app for enabling real-time interaction as well as a text and an image may be shared through a messenger, and usage range of the messenger is widened. In addition, an app execution function may be additionally provided without changing a function for a legacy messenger service and installing new messenger application, thereby enhancing user convenience.

Additional and/or other aspects and advantages of one or more exemplary embodiments will be set forth in part in the description which follows and, in part, will be obvious from the description, or may be learned by practice of one or more exemplary embodiments.

BRIEF DESCRIPTION OF THE DRAWINGS

The above and/or other aspects of one or more exemplary embodiments will be more apparent by describing certain exemplary embodiments with reference to the accompanying drawings, in which:

FIG. 5 is a sequence diagram for explaining an operation of a message server providing system according to an exemplary embodiment;

FIGS. 6A to 6H and 7A to 7E are diagrams for explaining a method of providing a user interface (UI) image according to various exemplary embodiments;

DETAILED DESCRIPTION OF EXEMPLARY EMBODIMENTS

Hereinafter, certain exemplary embodiments will be described in detail with reference to the attached drawings.

Figure 1:
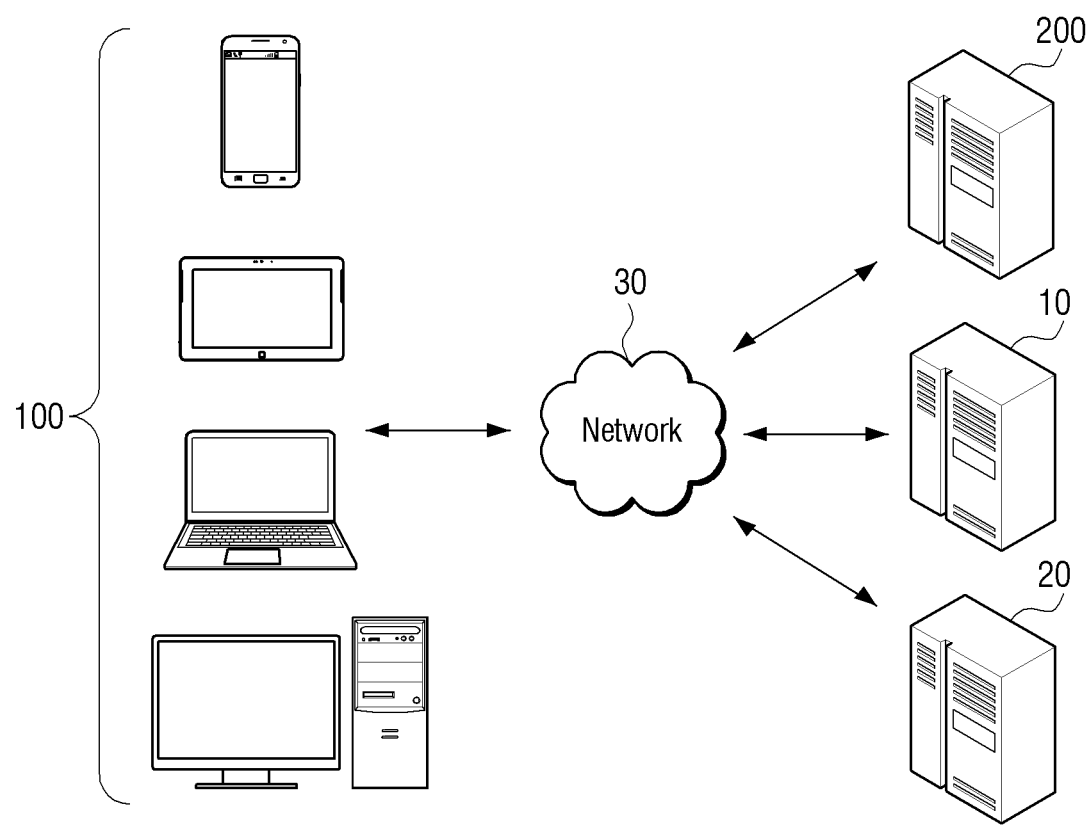
FIG. 1 is a diagram of a messenger service providing system according to an exemplary embodiment.

FIG. 1 is a diagram of a messenger service providing system according to an exemplary embodiment.

Referring to FIG. 1, the messenger service providing system includes a user terminal apparatus 100, an application (app) management server 200, a messenger service providing server 10, and an app providing server 20.

The user terminal apparatus 100 may be embodied as, but is not limited to, a portable phone, such as a smart phone, and may be any apparatus that has a display function and provides a messenger service, such as a tablet personal computer (PC), a portable multimedia player (PMP), a personal digital assistant (PDA), a navigation player, a digital television (TV), a PC, and so on. The user terminal apparatus 100 may include a touchscreen installed in therein, and may be configured to execute a program using a finger or a pen (e.g., a stylus pen).

The user terminal apparatus 100 may be configured to communicate with the messenger service providing server 10 through a network 30 so as to provide a messenger service. The messenger service may be provided in the form of a software application that is used by a user on an operating system (OS), and the application may include an icon interface on a screen of the user terminal apparatus 100. The messenger service is a service for supporting real-time text communication of two or more users using a network, such as the Internet, and an instant messenger is a client used in the corresponding service. The messenger service may be referred to as an instant messenger in that the service supports prompt communication and may also be referred to as an Internet messenger in that the service is a messenger that uses the Internet. The messenger service providing server 10 is a management server for supporting an instant messenger, and supports an instant messenger service between terminals via membership register and authentication. In detail, the messenger service providing server 10 may provide a communication space (hereinafter, referred to as a 'chat window') through which a user logs into the corresponding messenger service using the user terminal apparatus 100. Other functions of the messenger service providing server 10 may be similar to a legacy instant messenger.

The user terminal apparatus 100 may be configured to execute an application (hereinafter, app) on a messenger service screen. Here, the app may be an executable application program and include various executable multimedia content. Here, the term 'multimedia content' may include, but is not limited to, text, audio, a still image, animation, video, interactivity content, electronic program guide (EPG) content from a content provider, an electronic message received from another user, information about a current event, and so on.

The user terminal apparatus 100 may be configured to communicate with the app management server 200 to provide an app execution image during provision of the messenger service. The app management server 200 manages executable app information on a messenger service image and provides app information selected according to a command received from the user terminal apparatus 100 to the user terminal apparatus 100. The app management server 200 may manage an execution command and Uniform Resource Locator (URL) information of an executable web app and provide an execution command and URL information selected based on a command received from the user terminal apparatus 100 to the user terminal apparatus 100.

The user terminal apparatus 100 may receive app execution information from the app providing server 20 based on the execution command and the URL information of the web app received from the app management server 200 and provide an app execution image. The app providing server 20 may be a server that manages a resource and/or a source code of an app, and may be a server that is managed by a developer and/or a development company that developed the corresponding app. For example, a developer and/or a development company that develops a web app may provide only accessible URL information of the corresponding web app to the app management server 200 and manage a substance of the web app, that is, a resource and/or a source code, through a separate server, that is, the app providing server 20.

Based on this system, the user terminal apparatus 100 may provide an app that is optimized to participant information in a chat window of a messenger service with which a user interacts in real time while using a legacy instant messenger, that is, a commercially available instant messenger. Hereinafter, for convenience of description, various exemplary embodiments will be described in detail with reference to the drawings.

Figure 2A:
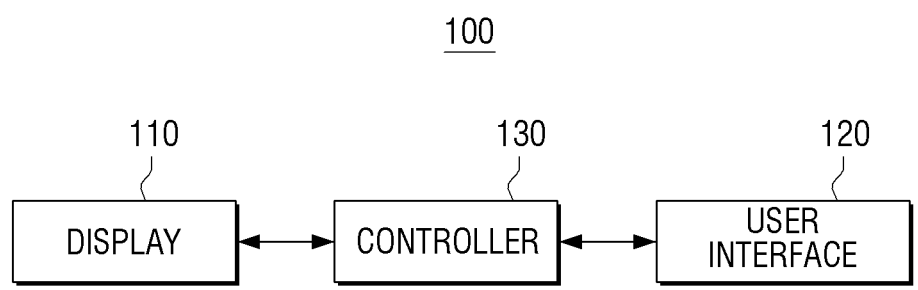
FIGS. 2A and 2B are block diagrams of a user terminal apparatus according to various exemplary embodiments.
Figure 2B:
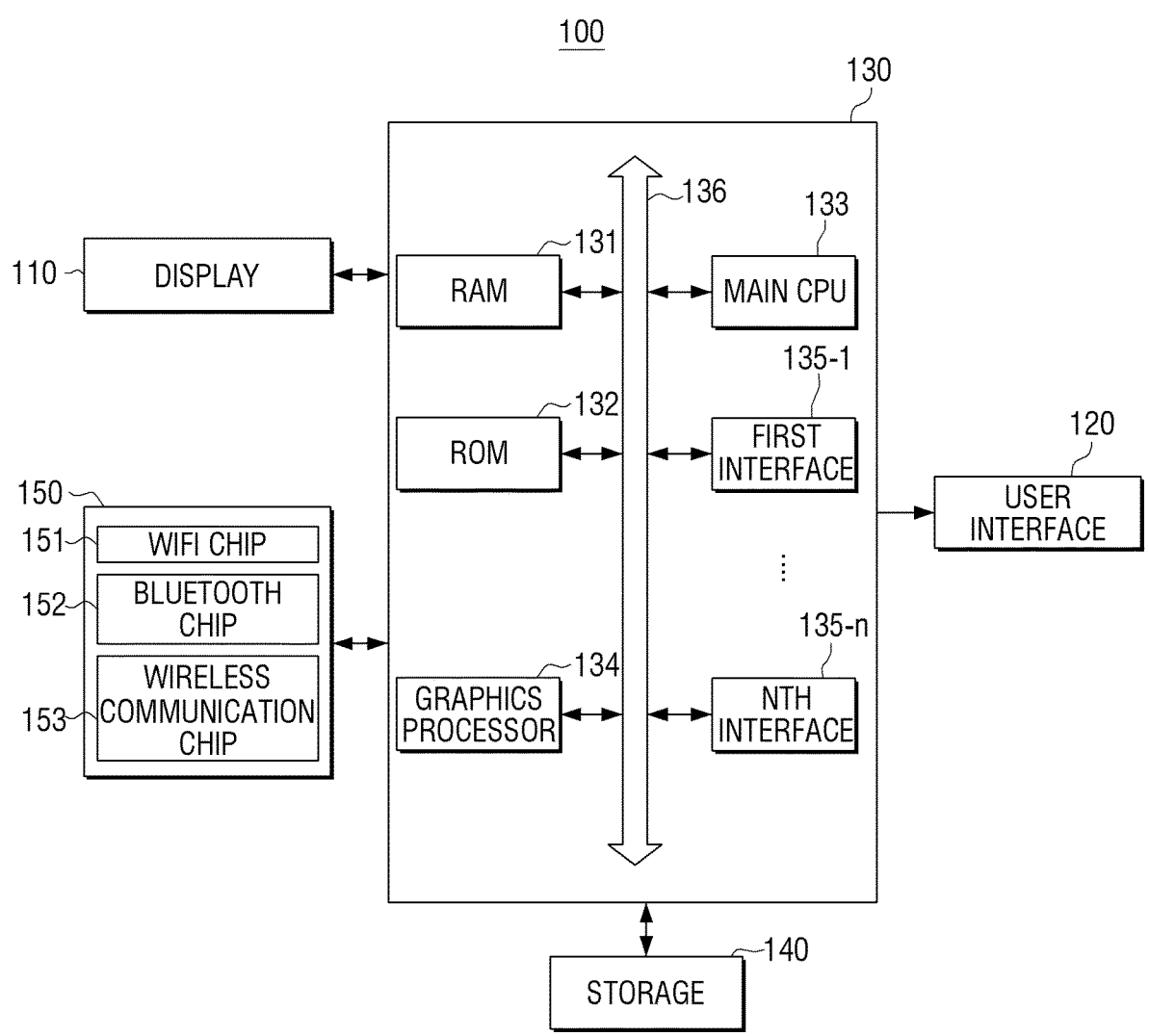

FIGS. 2A and 2B are block diagrams of the user terminal apparatus 100 according to various exemplary embodiments.

Referring to FIG. 2A, the user terminal apparatus 100 includes a display 110, i.e., a display unit, a user interface 120, i.e., a user interface unit, and a controller 130, i.e., a processor.

The display 110 displays an image. Here, the image may include various content such as a still image, video, text, an application execution image including various content, a graphic user interface (GUI) image, and so on.

The display 110 displays an instant messenger service image including an output message. Here, the output message is a message received based on the instant messenger service and refers to a message to be transmitted to a user of the user terminal apparatus 100.

The display 110 may display a service image including the received message when the instant messenger application is automatically driven or driven according to a user command as the message is received.

The display 110 may be embodied as, but is not limited to, a liquid crystal display (LCD) panel, an organic light emitting diode (OLED), or the like. The display 110 may include a touchscreen having an interlayer structure together with a touchpad. In this case, the display 110 may be used as the user interface 120 in addition to an output device. The touchscreen may be configured to detect a touch input pressure as well as a touch input position and area.

The user interface 120 receives various user commands.

In particular, the user interface 120 may receive various information items such as a text, an image, and so on, to be transmitted to a counterpart terminal on the instant messenger service image.

The user interface 120 may receive various user commands, such as a user command for driving instant messenger application and a user command for performing various functions in a corresponding service image. In particular, the user interface 120 may receive a user command for execution of the app in the corresponding service image.

The user interface 120 may be embodied as a touchscreen, as described above. In some exemplary embodiments, the user interface 200 may be embodied in various forms, such as a remote control receiver, a mouse, a physical button, a camera, a microphone, and so on.

The controller 130 controls an overall function of the user terminal apparatus 100.

In particular, the controller 130 may provide an app execution mode for an app, such as a web app in the instant messenger image. That is, the app execution mode may add a web app execution to the instant messenger service and may be configured such that the instant messenger may operate in the same way as a legacy messenger but the user terminal apparatus 100 supports the additional function for web app execution.

The controller 130 may provide the app based on information of participants in a chat window of the messenger service.

In response to a user command for app execution being input in the messenger service image, the controller 130 may transmit identifier information of the corresponding app and information of the participants in the chat window to the corresponding app providing server 20, and receive app execution information based on the participant information from the app providing server 20. The controller 130 may perform a function through a pre-installed app launcher for app execution. That is, the service may be provided in conjunction with various types of messengers, and app execution is controlled by separate app launcher software installed in a user terminal.

The controller 130 may access a web app provided by the app providing server 20 using URL information of the app and provide participant information to the web app to receive app execution information corresponding to the participant information. The controller 130 may transmit the participant information to the web app using a software development kit (SDK). The participant information may include various information items for identifying a participant, such as, as non-limiting examples, a participant ID, a nickname, profile information, profile image, and so on.

The controller 130 may provide the received app execution information as an input message of the messenger service. That is, when a chat window of the messenger service is enabled, in response to app execution information executable in the messenger service being received, the controller 130 may provide the app execution information as an input message of the messenger service, and the app may be automatically executed. The app execution information may include an execution command for automatically executing the app as well as app configuration information for configuring an app execution image. As necessary, in response to app execution information being received, the controller 130 may add the received app execution information to an app execution command and provide the app execution information as an input message of the messenger service. Alternatively, the app may be executed when app execution information input to the chat window is selected.

The app execution information may be displayed in various forms provided by the messenger service providing server 10 or the app management server 200, such as an item, an icon, or a text, representing a corresponding app in the chat window of a messenger service, a thumb nail about an initial image of the corresponding app, and so on. An already executed app may be distinguished from an app that is not executed. For example, when app execution information is provided in the form of an icon corresponding to an already executed app may be displayed in a disable state (e.g., gray tone) so as to be visually distinguished from an app that is not yet executed.

As described above, a function of the instant messenger is not changed in the app execution mode in that the instant messenger simply transmits an input message.

In response to an app being executed, the controller 130 may display an app execution image over a whole of a chat window of the messenger service, and, in response to the app execution being finished, the controller 130 may restore the messenger service image to a previous image. The app execution image may be embodied as, but is not limited to, a separate image that is displayed visually overlapped with the chat window of the messenger service.

In addition, the controller 130 may receive and display an app list from the app management server 200 according to a preset event and transmit information corresponding to an app and participant information of a participant in the chat window to the app providing server 20 in response to a user command selecting the app from the app list. The controller 130 may acquire the participant information of the chat window through a messenger client. The preset event may include a user command for selection of a preset item provided in the messenger service image and a user command for inputting identifier information (e.g., a URL address of the app management server 200) including a specific identifier code (e.g., a special character such as '@' and '/') to a chat window. For example, when a preset event linked with the app management server 200 is provided in the messenger service image, the controller 130 may access the app management server 200 and provide the app list according to a user selection of the preset event link. As another example, the controller 130 may access the app management server 200 and receive the app list according to a user input of a specific keyword to a chat window. However, exemplary embodiments are not limited thereto, and an app execution mode for displaying an app list may be enabled in real time via various methods, such as, as non-limiting examples, a software button, a hardware button, a voice command, pen input, motion recognition, and so on.

A user command for the aforementioned app execution may be a user command for a selection of specific app information (e.g., an app icon, app identifier information, and so on) provided from the app management server 200, or, alternatively, may be a user command for inputting a preset type of information for identification of the app in the chat window of the messenger service. That is, when a user knows app identifier information, it may be possible to input the app identifier information together with a specific identifier code to directly execute the specific app. For example, in response to "@ladder" being input, a corresponding ladder application may be directly executed.

In addition, in response to app execution being terminated, the controller 130 may receive an app execution result to which real-time interaction by a chat window participant in the app execution image is applied from the app providing server 20, and provide the app execution result as an input message of the messenger service. Accordingly, the controller 130 may receive app execution results from user terminals of participants in the chat window.

FIG. 2B is a block diagram illustrating a detailed configuration of the user terminal apparatus 100 illustrated in FIG. 2A.

Referring to FIG. 2B, the user terminal apparatus 100 may include the display 110, the user interface 120, the controller 130, a storage 140, i.e., a storage unit, and a communicator 150, i.e., a communication unit. The display 110, the user interface 120, and the controller 130 may be similar to the corresponding components described with reference to FIG. 2A.

The controller 130 controls an overall operation of the user terminal apparatus 100 using various programs stored in the storage 140.

For example, the controller 130 may execute an application stored in the storage 140 to configure the execution image and display the execution image, or may reproduce various content stored in a storage 140. In addition, the controller 130 may communicate with external devices through the communicator 150.

The controller 130 includes a random access memory (RAM) 131, a read-only memory (ROM) 132, a main central processing unit (CPU) 133, a graphics processor 134, first to $n^{th}$ interfaces 135-1 to 135-n, and a bus 136.

The RAM 131, the ROM 132, the main CPU 133, the graphics processor 134, and the first to $n^{th}$ interfaces 135-1 to 135-n may be connected to each other through the bus 136.

The first to $n^{th}$ interfaces 135-1 to 135-n are connected to the aforementioned components. One of the interfaces may be a network interface that is connected to an external device through a network.

The main CPU 133 accesses the storage 140 and performs booting of the display using an operating system (O/S) stored in the storage 140. In addition, the main CPU 133 performs various operations using various programs, content, data items, and so on, which are stored in the storage 140.

The ROM 132 stores a command set for system booting. When a turn-on command is input, the main CPU 133 copies the O/S stored in the storage 140 according to a command stored in the ROM 132 to the RAM 131, and executes the O/S to boot the system. When booting is finished, the main CPU 133 copies various application programs stored in the storage 140 to the RAM 131 and executes the application program copied to the RAM 131 to perform various operations.

The graphics processor 134 generates an image containing various objects such as an icon, an image, a text, and so on using a calculator and a renderer. The calculator calculates an attribute value such as a coordinate value, a shape, a size, color, etc. for displaying objects according to a layout of a screen. The renderer generates various layouts of images based on the attribute values calculated by the calculator. The images generated by the renderer are displayed within a display region of the display 110.

The aforementioned operation of the controller 130 may be performed according to a program stored in the storage 140. The storage 140 may store various data items such as an O/S software module for driving the user terminal apparatus 100, various applications, and various content input or set during application execution.

In particular, the storage 140 may store a launcher for execution of the app in the messenger service image. The launcher communicates with the app management server 200 and the app providing server 20 to execute the app in the messenger service image. The launcher may not be independently executed, but may be driven only when an execution command for the received app in the messenger service image. The launcher may be downloaded and installed from a server for management of a corresponding program or may be installed during a manufacture of the user terminal apparatus 100.

Various software modules stored in the storage 140 will be described below with reference to FIG. 3.

Figure 3:
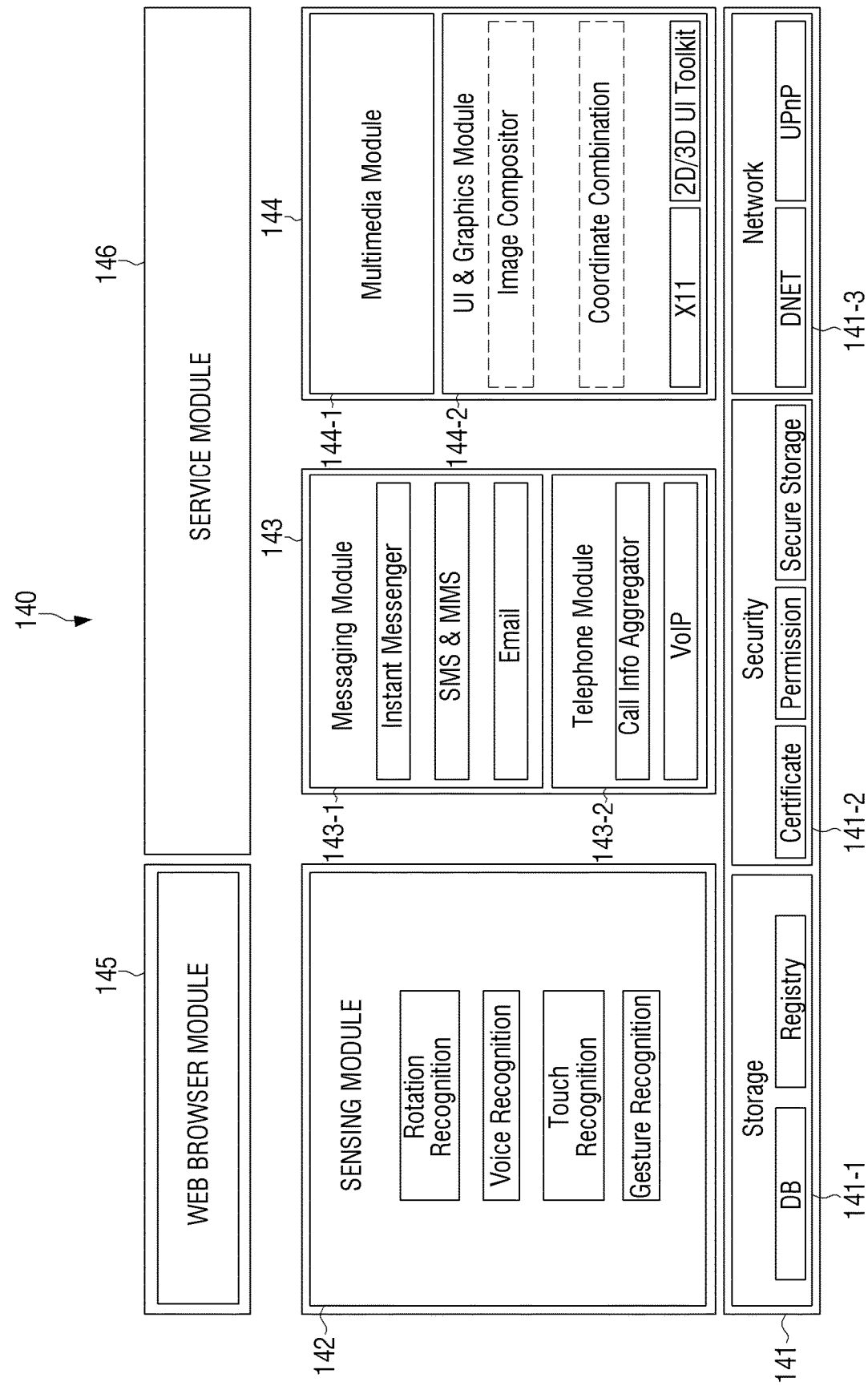
FIG. 3 illustrates various software modules stored in a storage according to an exemplary embodiment.

Referring to FIG. 3, the storage 140 may store software including a base module 141, a sensing module 142, a communication module 143, a presentation module 144, a web browser module 145, and a service module 146.

The base module 141 processes a signal transmitted from hardware contained in the user terminal apparatus 100 and transmits the signal to a high layer module. The base module 141 includes a storage module 141-1, a security module 141-2, and a network module 141-3. The storage module 141-1 is a program module for management of a database (DB) or a register. The main CPU 133 may access a DB in the storage 140 and read various data items using the storage module 141-1. The security module 141-2 is a program module for supporting certification of hardware, permission requests, secure storage, and so on. The security module 141-2 may store a program for supporting an encryption function. The network module 141-3 supports network access and includes a DNET module, a universal plug and play (UPnP) module, and so on.

The sensing module 142 collects information from various sensors and analyzes and manages the collected information. The sensing module 142 may include a face recognition module, a voice recognition module, a motion recognition module, a near-field communication (NFC) recognition module, and so on.

The communication module 143 communicates with external devices. The communication module 143 may include a messaging module 143-1 such as a messenger program, a short message service (SMS) program, a multimedia message service (MMS) program, and an e-mail program, and a telephone module 143-2 including a call info aggregator program module and a voice-over internet protocol (VoIP) module.

The presentation module 144 configures a display image. The presentation module 144 reproduces various multimedia content and generates and reproduces an image and a sound. The presentation module 144 includes a multimedia module 144-1 for reproducing and outputting multimedia content, and a user interface (UI) and graphics module 144-2 for performing UI and graphics processing. The multimedia module 144-1 may include a player module, a camcorder module, a sound processing module, and so on. The UI and graphics module 144-2 may include an image compositor module for composing images, a coordinate combination module for combining and generating coordinates on a screen in which an image is to be displayed, an X11 module for receiving various events from hardware, and a 2D/3D UI tool kit for providing a configuration of a 2D or 3D form of UI.

The web browser module 145 performs web browsing to access a web server. The web browser module 145 may include various modules such as a web view module for configuration of a web page, a download agent module for performing downloads, a bookmark module, a web-kit module, and so on.

The service module 146 includes various applications for providing various services. For example, the service module 146 may include various program modules such as a navigation program, a content reproducing program, a game program, an e-book program, a calendar program, an alarm management program, and other widgets.

The service module 146 may store a launcher program that provides an app execution service in the aforementioned messenger service image. However, this is merely an example, and the launcher program may be included in other modules.

Although various program modules are illustrated in FIG. 3, the illustrated various program modules may be partially omitted or modified, or additional program modules may be added according to the type and features of a user terminal apparatus 100. For example, a user terminal apparatus 100 may further include a position based module for supporting a position based service in conjunction with hardware, such as a global positioning system (GPS) chip.

The communicator 150 communicates with various types of external devices according to various types of communication methods. The communicator 150 includes various communication chips such as a WiFi chip 151, a Bluetooth chip 152, a wireless communication chip 153, and so on.

The WiFi chip 151 and the Bluetooth chip 152 perform communication using a WiFi method and a Bluetooth method, respectively. The wireless communication chip 153 performs communication according to various communication standards such as IEEE, Zigbee, $3^{rd}$ generation (3G), $3^{rd}$ generation partnership project (3GPP), long term evolution (LTE), and so on. In addition, a communicator 150 may further include an NFC chip that operates using a near field communication (NFC) method using a band of 13.56 MHz among various RF-ID frequency bands such as 135 kHz, 13.56 MHz, 433 MHz, 860 to 960 MHz, 2.45 GHz, and so on.

The communicator 150 may communicate with at least one of the messenger service providing server 10, the app providing server 20, and the app management server 200. The same communication method may be used in communication with each server, of different communication methods may be used. Communication may be performed through the wireless communication chip 153.

The user terminal apparatus 100 may further include an audio processor, a video processor, a speaker, a button, a USB port, a camera, a microphone, and so on. The user terminal apparatus 100 may operate in a motion control mode or a voice control mode through the camera, the microphone, and so on.

Figure 4:
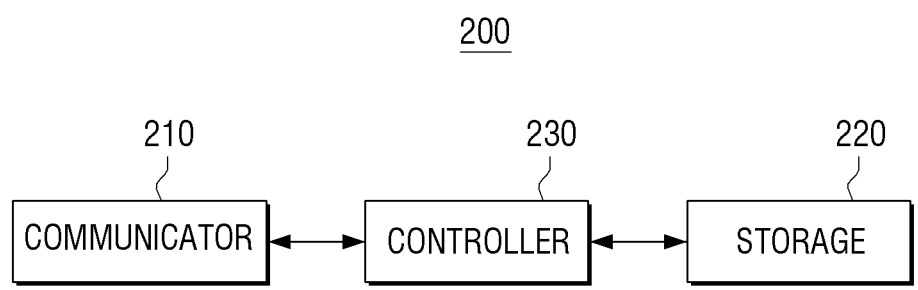
FIG. 4 is a block diagram illustrating an app management server according to an exemplary embodiment.

FIG. 4 is a block diagram illustrating an app management server according to an exemplary embodiment.

Referring to FIG. 4, the app management server 200 includes a communicator 210, i.e., a communication unit, a storage 220, i.e., a storage unit, and a controller 230, i.e., a processor.

The communicator 210 is a component that communicates with various types of external devices according to various types of communication methods. In particular, the communicator 210 may communicate with the user terminal apparatus 100 and may be similar to the communicator 150 illustrated in FIG. 2B.

The storage 220 may store information about an app. In particular, the storage 220 may store identifier information of an executable web app through web, URL information, and an execution command. The storage 220 may map and store various information items such as a web app icon, web app description, a web app keyword, and so on.

The controller 230 may control an overall operation of the app management server 200.

The controller 230 may perform an app mapping function of mapping and managing app information and an app store function of registering apps by app manufacturers and providing an app list to a user.

The controller 230 may perform an app store function of managing various web app lists and providing the app lists to the user. In this case, when new web app is registered through the app store function, the corresponding information may also be automatically applied to a table through the web mapping function.

In addition, the controller 230 may perform the web mapping function of managing a table in which an execution command of the web app and URL information of the web app are mapped. The controller 230 may provide the app list to the user through the app store function and execute an app based on the information mapped to a selected app through the app mapping function. Upon selection of a web app on the app list, the controller 230 acquires URL information of web app based on the aforementioned table and provides the acquired URL information to the user terminal apparatus 100. The user terminal apparatus 100 may receive app execution information from the app providing server 20 based on the URL information received from the app management server 200. Accordingly, the user terminal apparatus 100 may execute a new web app even if a pre-installed launcher is not updated.

According to the aforementioned exemplary embodiment, the app mapping function of mapping and managing app information and the app store function of providing app information to the user are performed by one app management server 200, but this is purely exemplary. The app mapping function and the app store function may be performed by separate servers, that is, an app mapping server and an app store server, respectively. In this case, the user terminal apparatus 100 may communicate with each of the app mapping server and the app store server or communicate with one server through the other server.

FIG. 5 is a sequence diagram for explaining an operation of a message server providing system according to an exemplary embodiment.

As illustrated in FIG. 5, a messenger service image for providing a messenger service is enabled through the messenger service providing server 10 in the user terminal apparatus 100 (S511). That is, a chat window in which users who log in to the corresponding messenger service have a conversation is enabled in a screen of the user terminal apparatus 100.

In response to a user command for display of an app list being input, the user terminal apparatus 100 may provide an app list request signal to the app management server 200 (S512).

In response to the app list request signal being received, the app management server 200 may provide app list information to the user terminal apparatus 100 (S513).

Then the user terminal apparatus 100 displays an app list based on the received app list information and receives a user command for selecting a specific app on the app list (S514).

In response to the user command for selecting the specific app, the user terminal apparatus 100 requests information about the selected app to the app management server 200 (S515), receives the requested app information (S516), and transmits the app information to the app providing server 20 (S517).

Then the user terminal apparatus 100 receives app execution information from the app providing server 20 (S518) and provides the app execution information as an input message to the chat window of the messenger service (S519). Accordingly, users that participate in the corresponding chat window may execute app through the chat window.

FIGS. 6A to 6H and 7A to 7E are diagrams for explaining a method of providing a user interface (UI) image according to various exemplary embodiments. Although FIGS. 6A to 6H and 7A to 7E illustrate first to third user terminal apparatuses 100-1, 100-2, and 100-3 which are adjacent to each other, this is for convenience of description. Accordingly, it would be obvious to one of ordinary skill in the art that the first to third user terminal apparatuses 100-1, 100-2, and 100-3 use the same messenger service through a messenger client.

FIGS. 6A to 6H are diagrams for explaining a method of providing a UI image of an app that is automatically executed to provide the app execution result without real-time user interaction during app execution.

As illustrated in FIG. 6A, it is assumed that users of the first to third user terminal apparatuses 100-1, 100-2, and 100-3 intend to execute app for action-based real-time interaction during a conversation based on a text and an image in a group chat window using an instant messenger service.

In response to a specific item 50 for app execution being selected in the third user terminal apparatus 100-3, the third user terminal apparatus 100-3 may display an app list 610, as illustrated in FIG. 6B. As illustrated in the drawing, the app list 610 may include information such as icons 611 and 612 indicating an app, an app name, a description, and so on. In this case, the third user terminal apparatus 100-3 may access the app management server 200 based on URL information linked to the app list 610, receive app list information from the app management server 200, and display the app list 610.

Figure 6C:
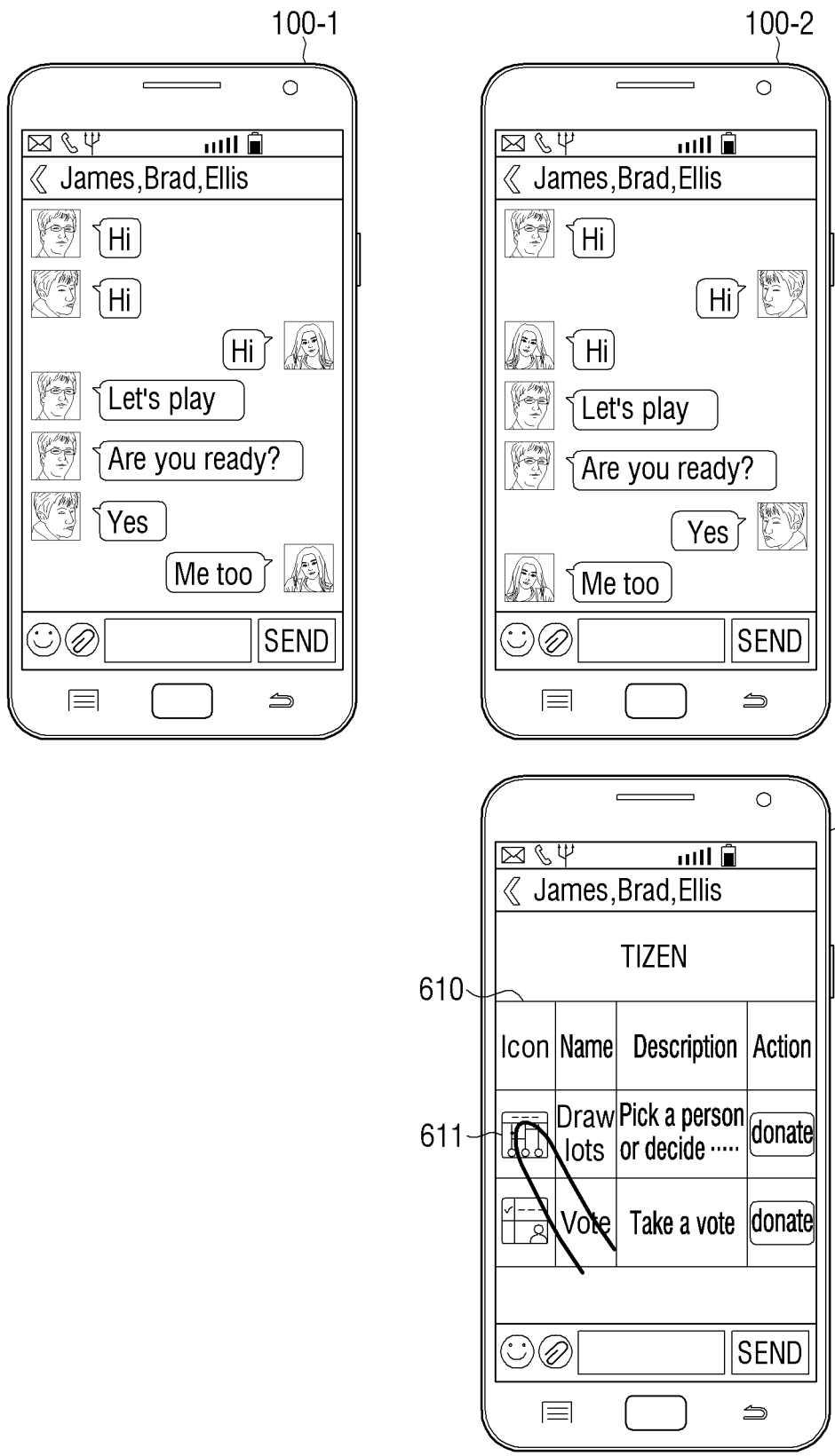

Then, as illustrated in FIG. 6C, in response to an icon 611 indicating a specific app (e.g., a drawing lots app) being selected on the app list 610 displayed on the third user terminal apparatus 100-3, app execution information items 621 to 623 corresponding to the selected app may be provided as an input message of the chat window. In this case, the third user terminal apparatus 100-3 may receive information (e.g., URL information) about the selected app from the app management server 200 and upload the information to the app providing server 20, and may receive app execution information from the app providing server 20 and provide the app execution information as an input message of a chat window. In response to information about app being updated to the app providing server 20, the third user terminal apparatus 100-3 may update the information together with participant information in the chat window. Accordingly, the app execution information received from the app providing server 20 may be app execution information to which information about participants in the chat window is applied.

Figure 6D:
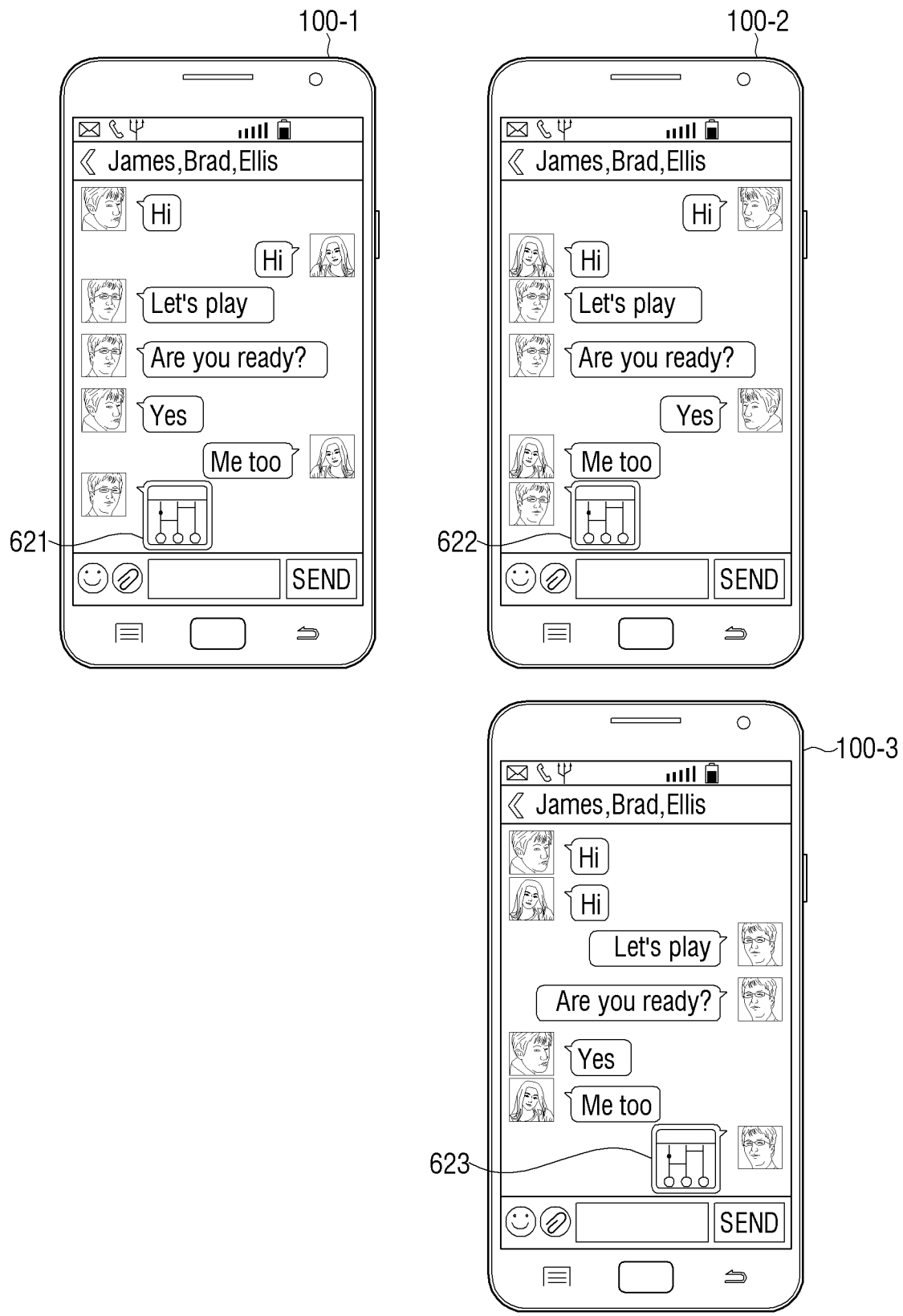
Figure 6E:
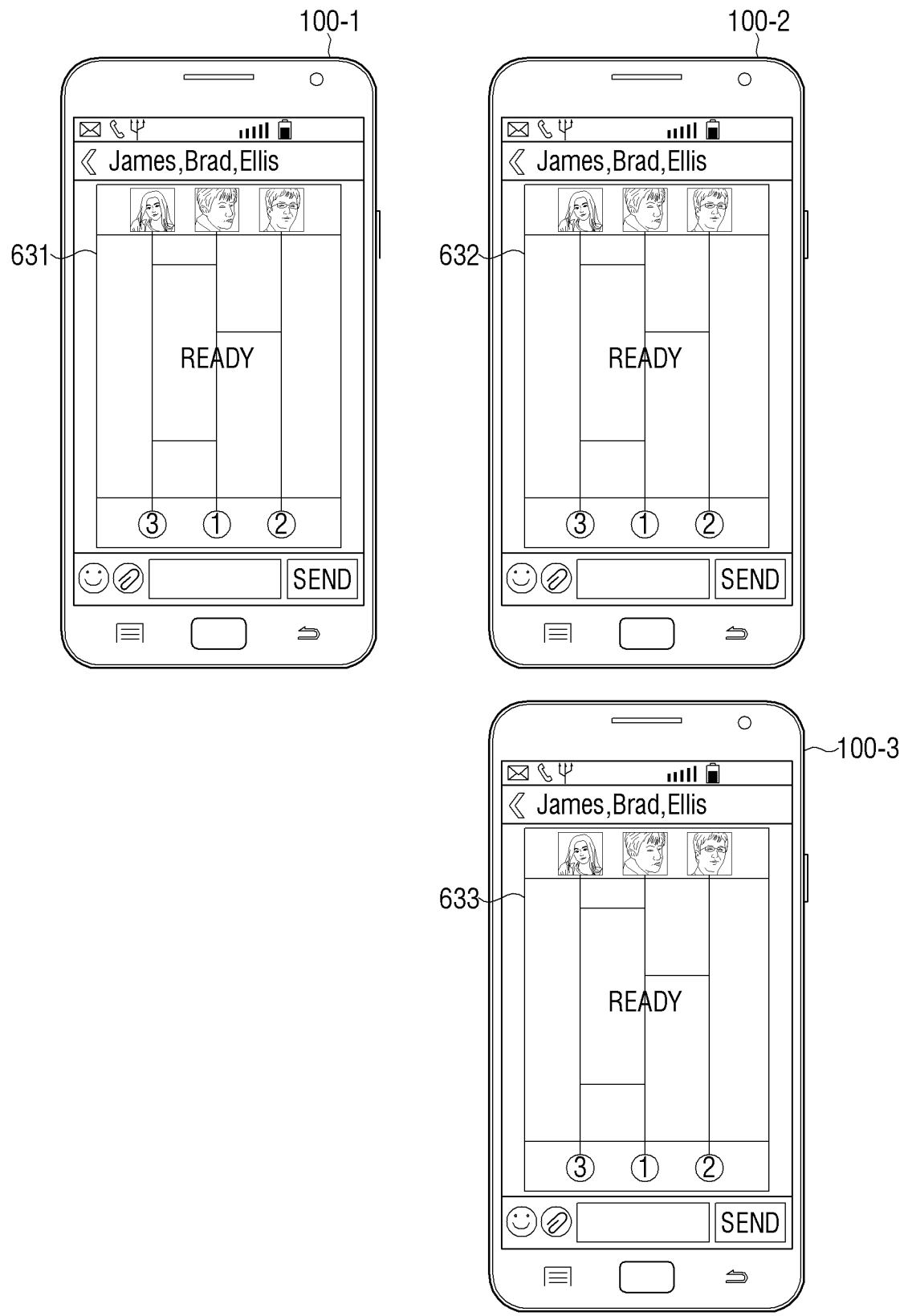

That is, as illustrated in FIG. 6D, as the app execution information (e.g., an app execution command) is provided as an input message of the chat window, an app execution image that is automatically executed and provided in the first to third user terminal apparatuses 100-1, 100-2, and 100-3 may provide the app to which the number of participants in the chat window, participant identifier information items 631 to 633, and so on, are applied.

Figure 6F:
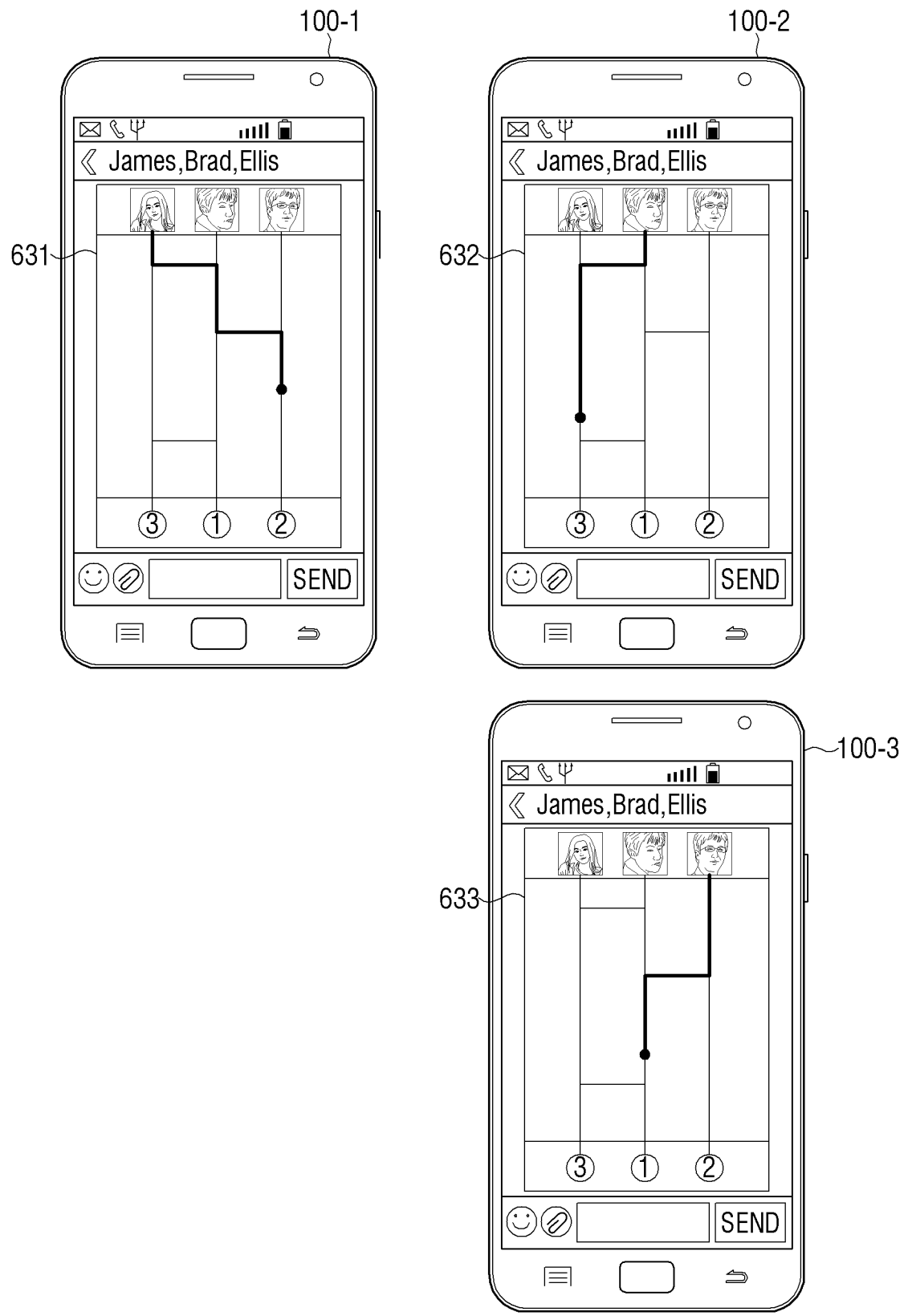
Figure 6G:
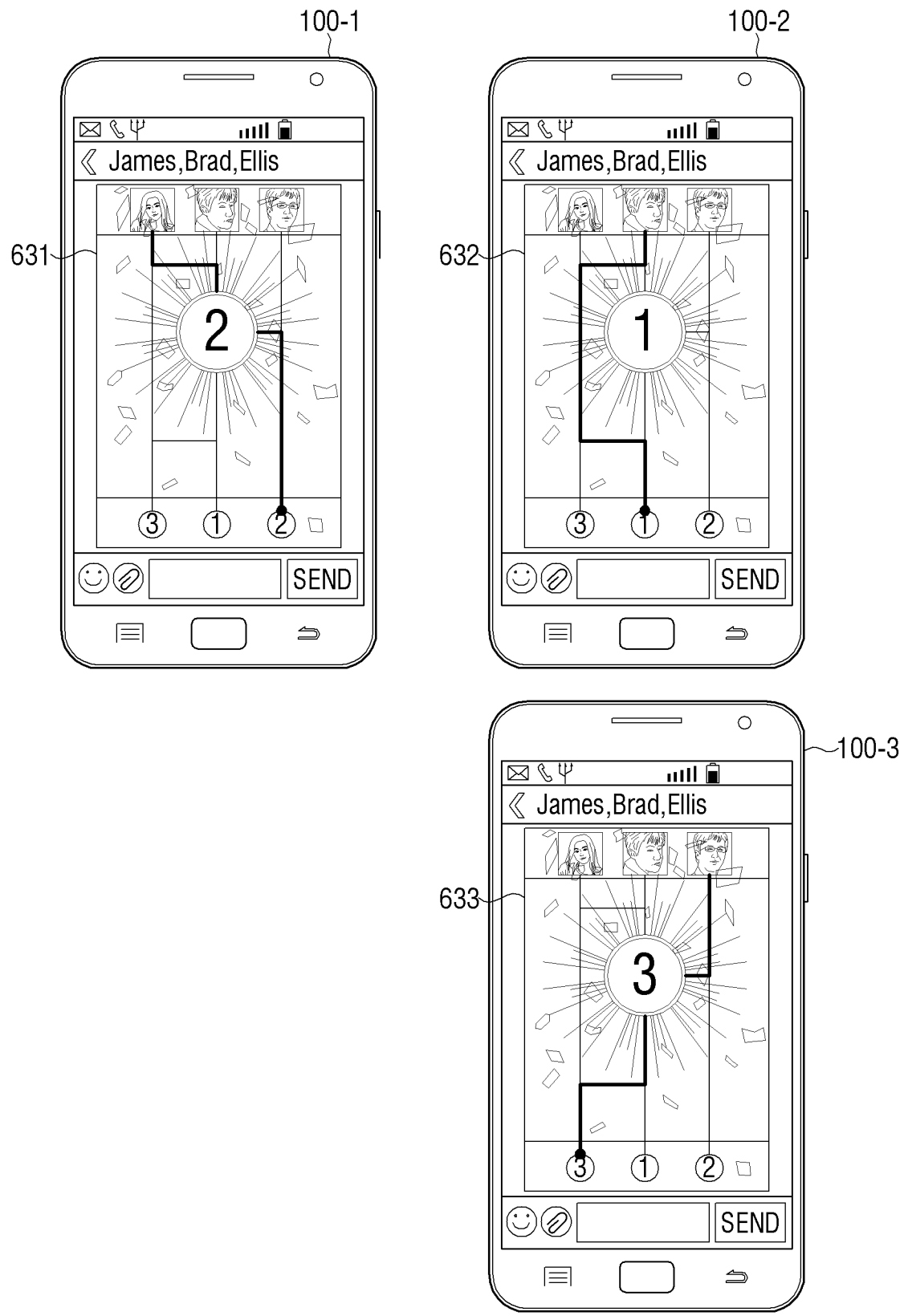
Figure 6H:
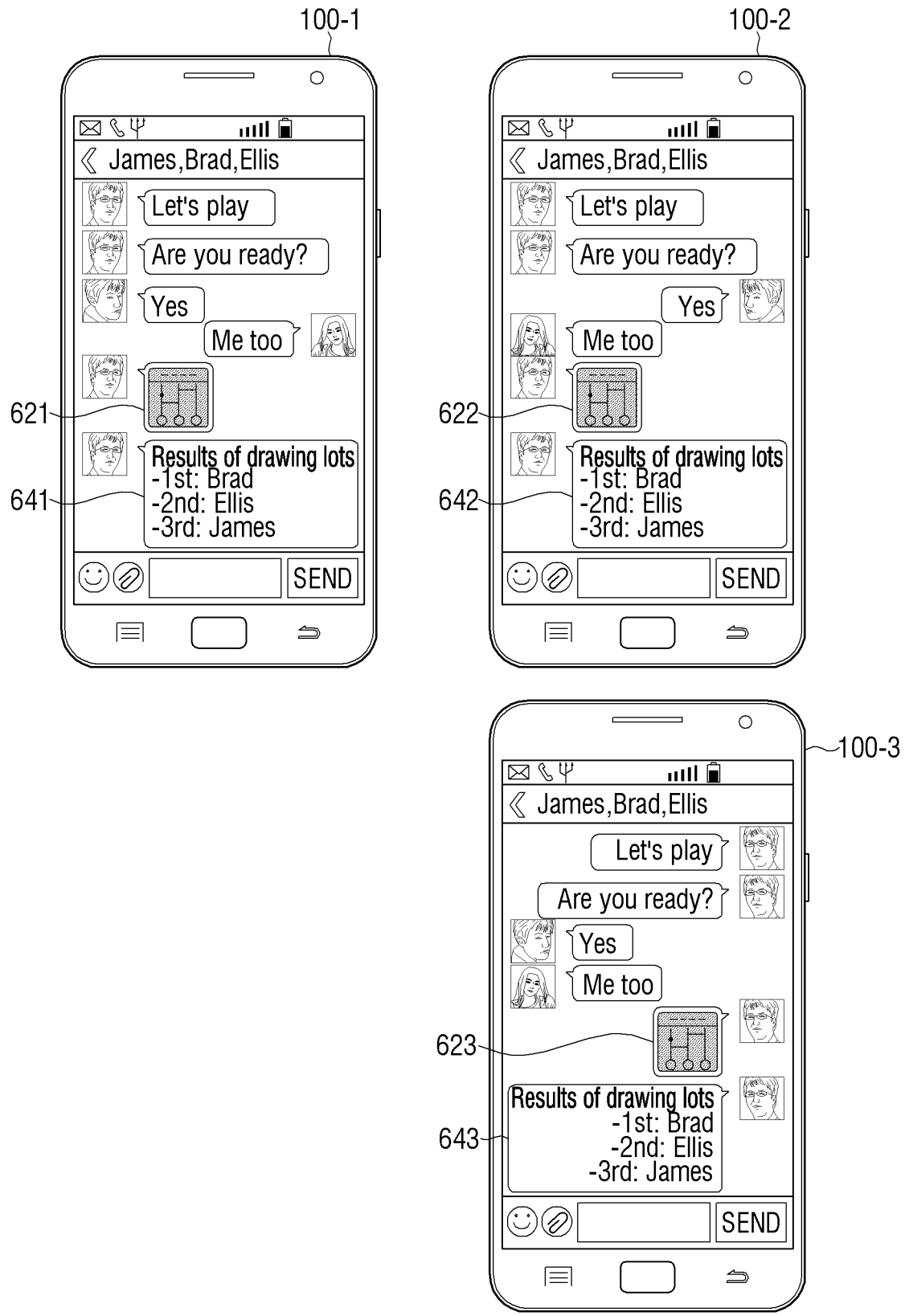

Then, as illustrated in FIGS. 6F and 6G, when the app execution proceeds (FIG. 6F) and is terminated (FIG. 6G), app execution results 641, 642, and 643 may be provided as an input message in the chat window so as to be shared by all participants, as illustrated in FIG. 6H. That is, the third user terminal apparatus 100-3 may receive the app execution result from the app providing server 20 and provide the app execution result as input messages in the chat window. However, in some exemplary embodiments, messenger clients of the first to third user terminal apparatuses 100-1, 100-2, and 100-3 may access the web app, and, thus, the app execution result may be provided directly from the web app.

As illustrated in FIG. 6H, when the app execution is terminated, the already executed app execution information items 621 to 623, that is, app icons, may be changed to a disabled state and displayed, for example, in a gray color.

FIGS. 7A to 7E are diagrams for explaining a method of providing a UI image when an app to which real-time user interface is applied is executed.

Figure 7B:
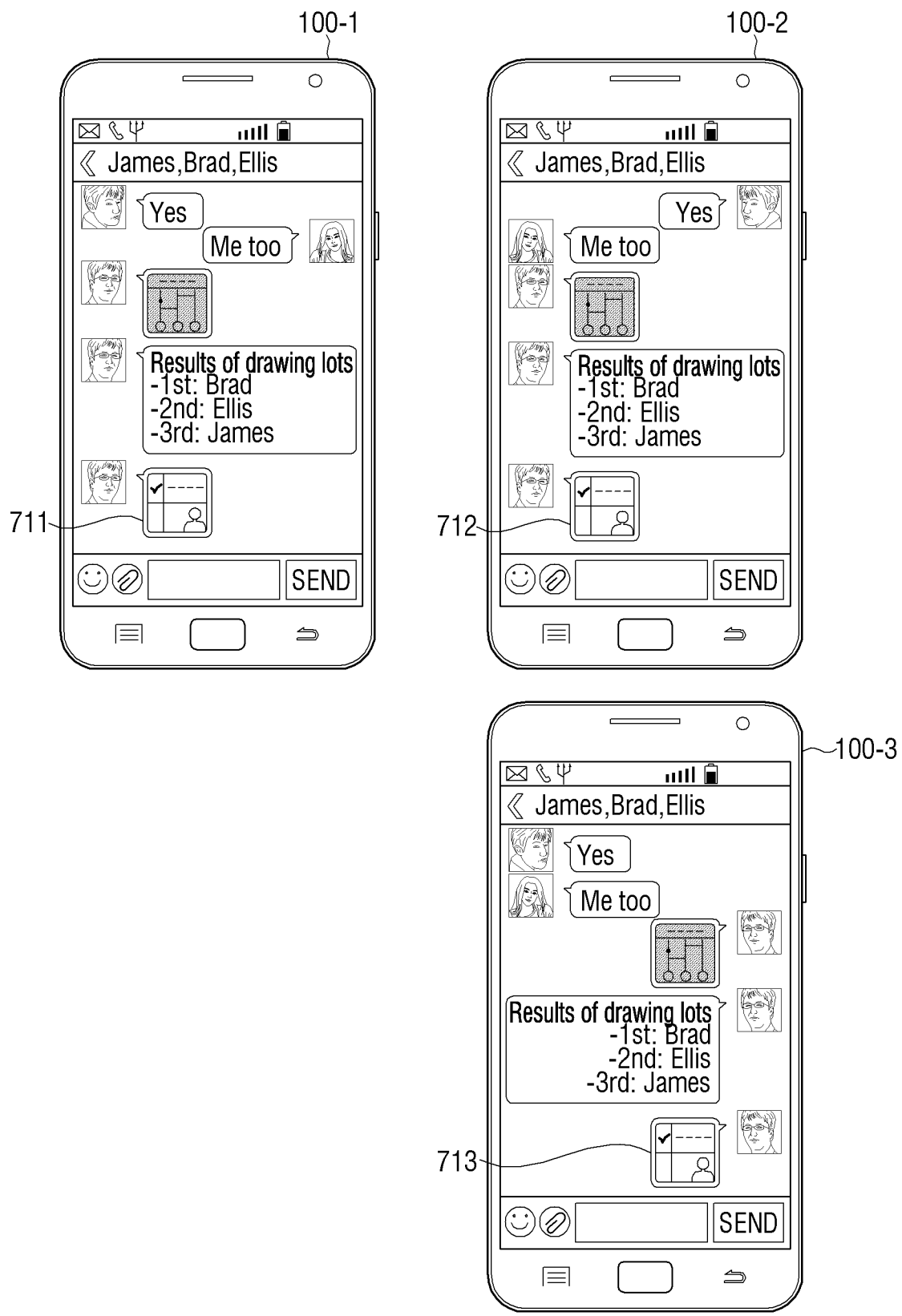

When the icon 612 indicating specific app (e.g., vote app) is selected on the app list 610 displayed on the third user terminal apparatus 100-3 (FIG. 7A), app execution information items 711 to 713 corresponding to the selected app may be provided as input messages of the chat window (FIG. 7B).

Figure 7C:
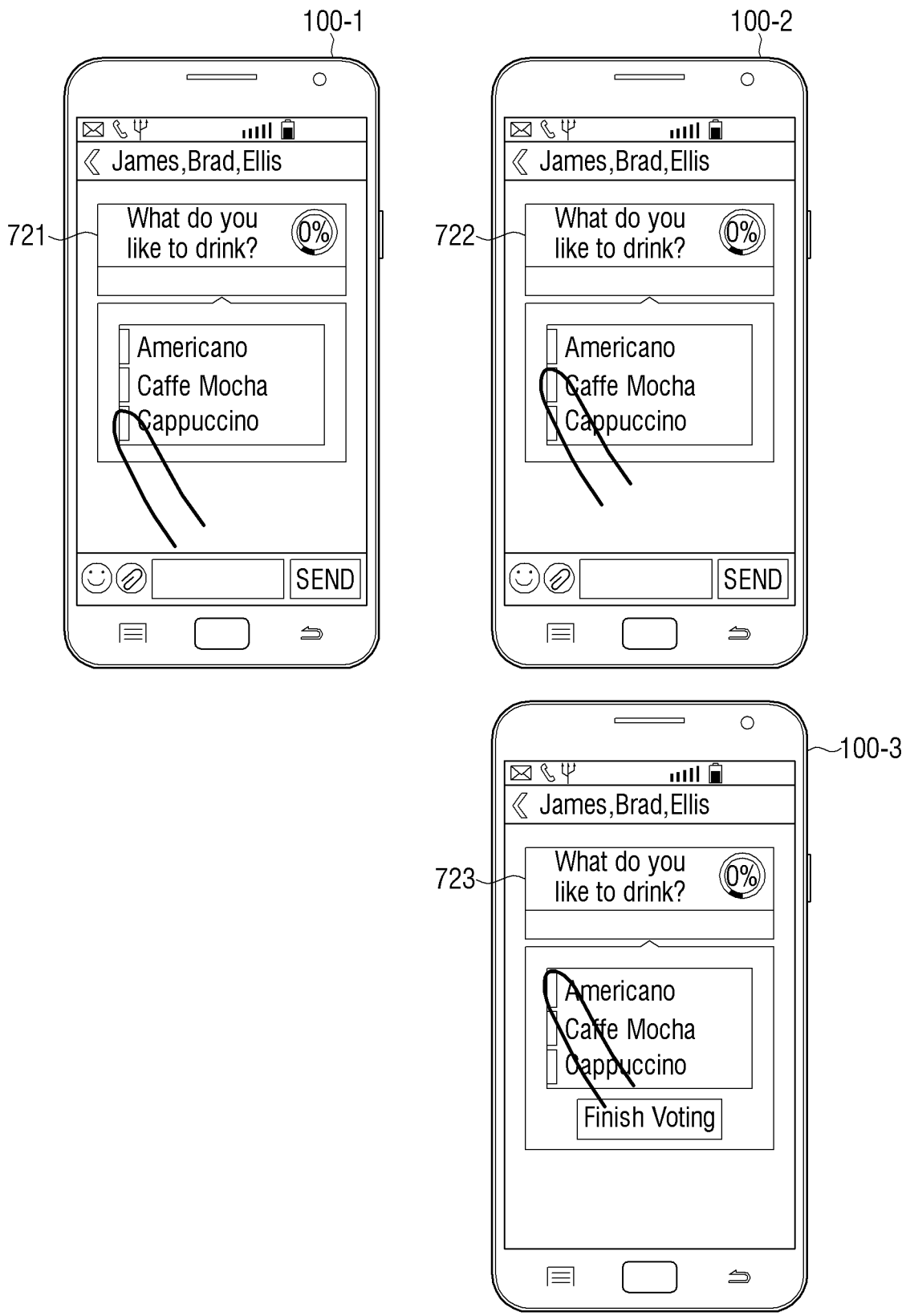

In this case, as illustrated in FIG. 7C, as app execution information (e.g., an app execution command) is provided as an input message of the chat window, an app execution image that is automatically executed and provided by the first to third user terminal apparatuses 100-1, 100-2, and 100-3 may provide an app for receiving real-time interaction of participants.

Figure 7D:
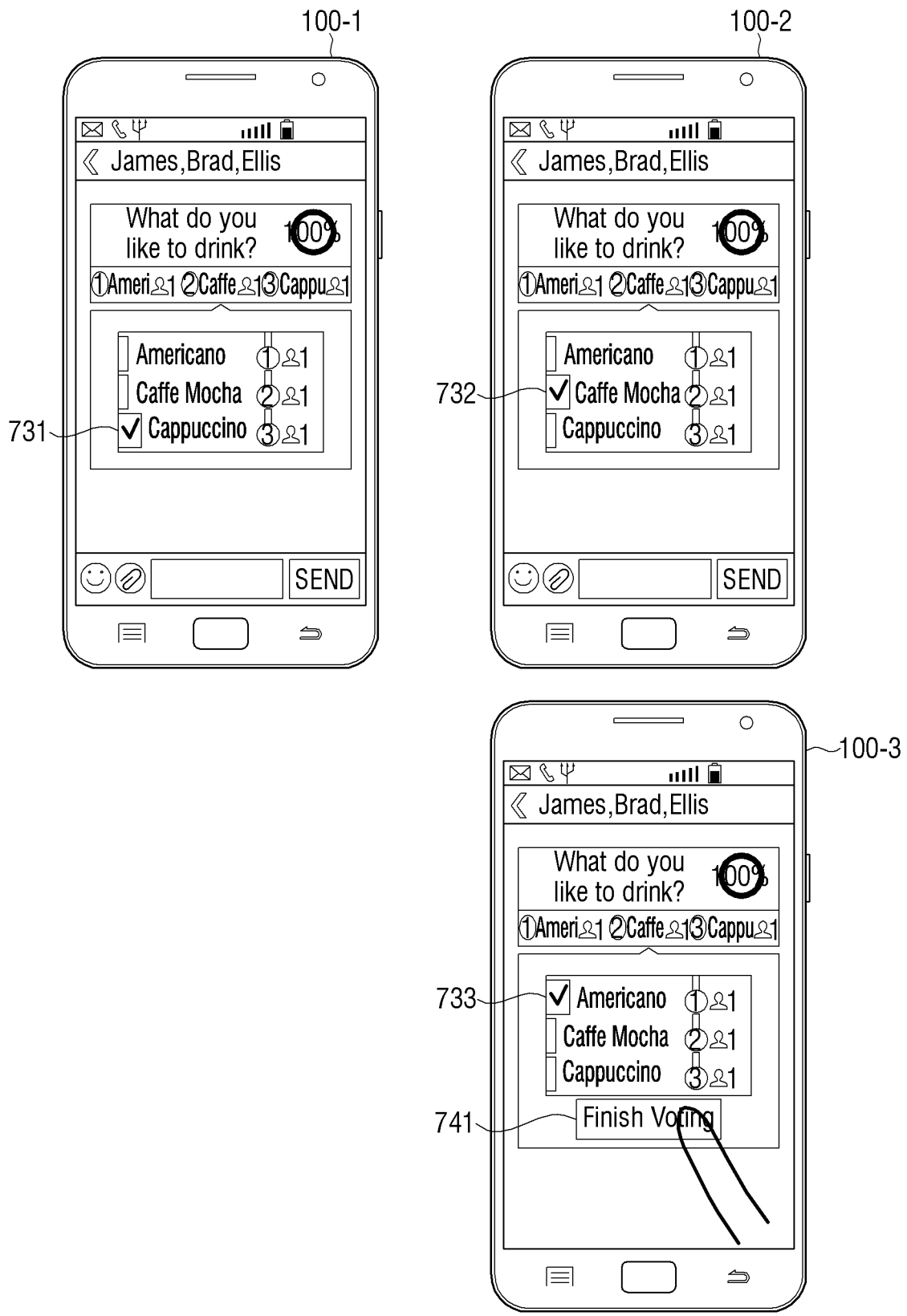

In response to real-time interaction (e.g., interaction for selection of drink menu) for an app image being input by participants of the chat window, corresponding input information items 731 to 733 may be applied to the app execution image through a web app function, as illustrated in FIG. 7D. In this case, real-time interaction (e.g., touch interaction) in a specific user terminal may be shared with another user terminal in real time.

The third user terminal apparatus 100-3 that executes app may provide a graphic user interface (GUI) 741 for terminating app execution, which is not provided in the first and second user terminal apparatuses 100-1 and 100-2.

Figure 7E:
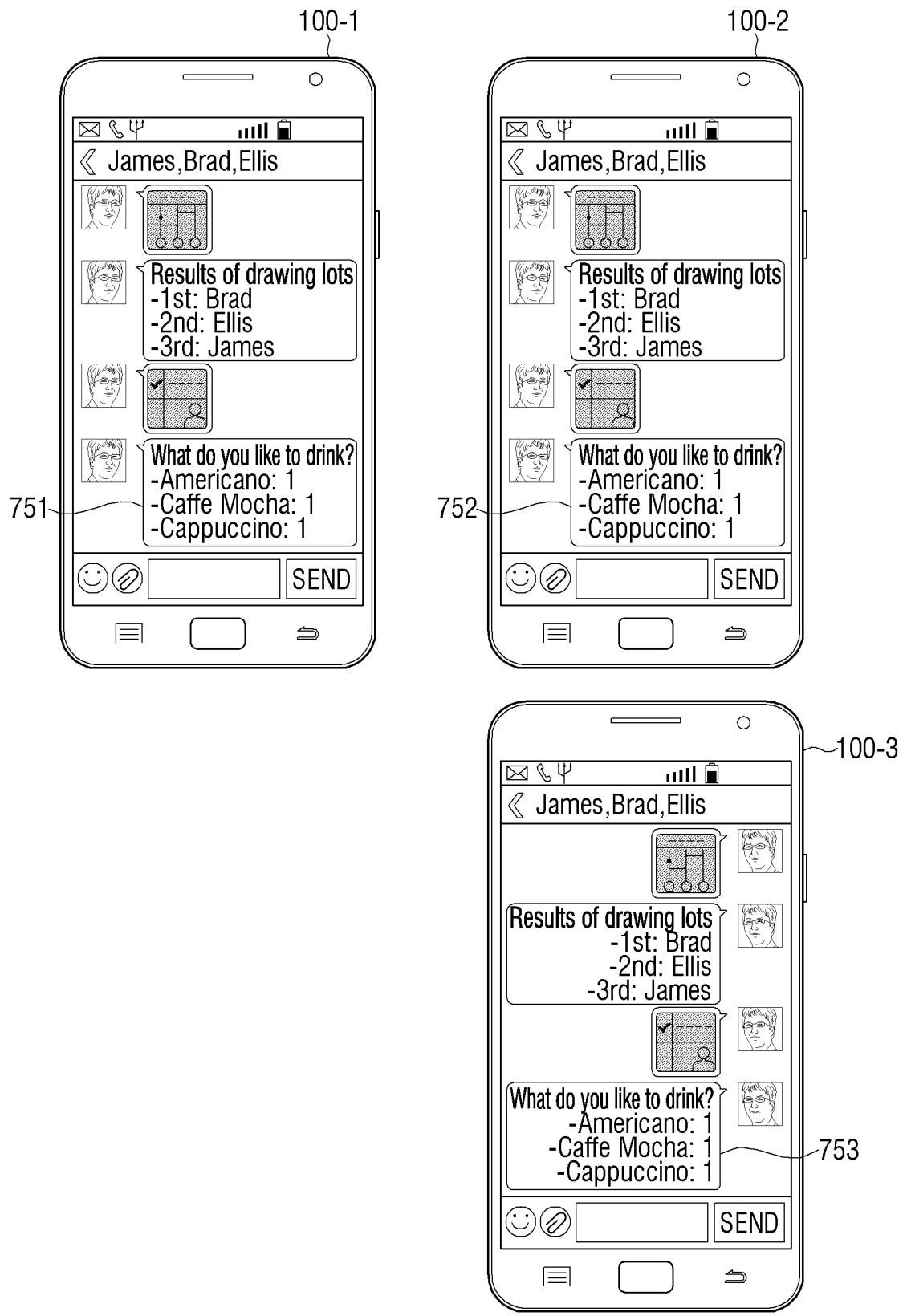

In response to the app execution being terminated, app execution results 751, 752, and 753 may be provided as input messages in the chat window so as to be shared by all participants, as illustrated in FIG. 7E.

Figure 8:
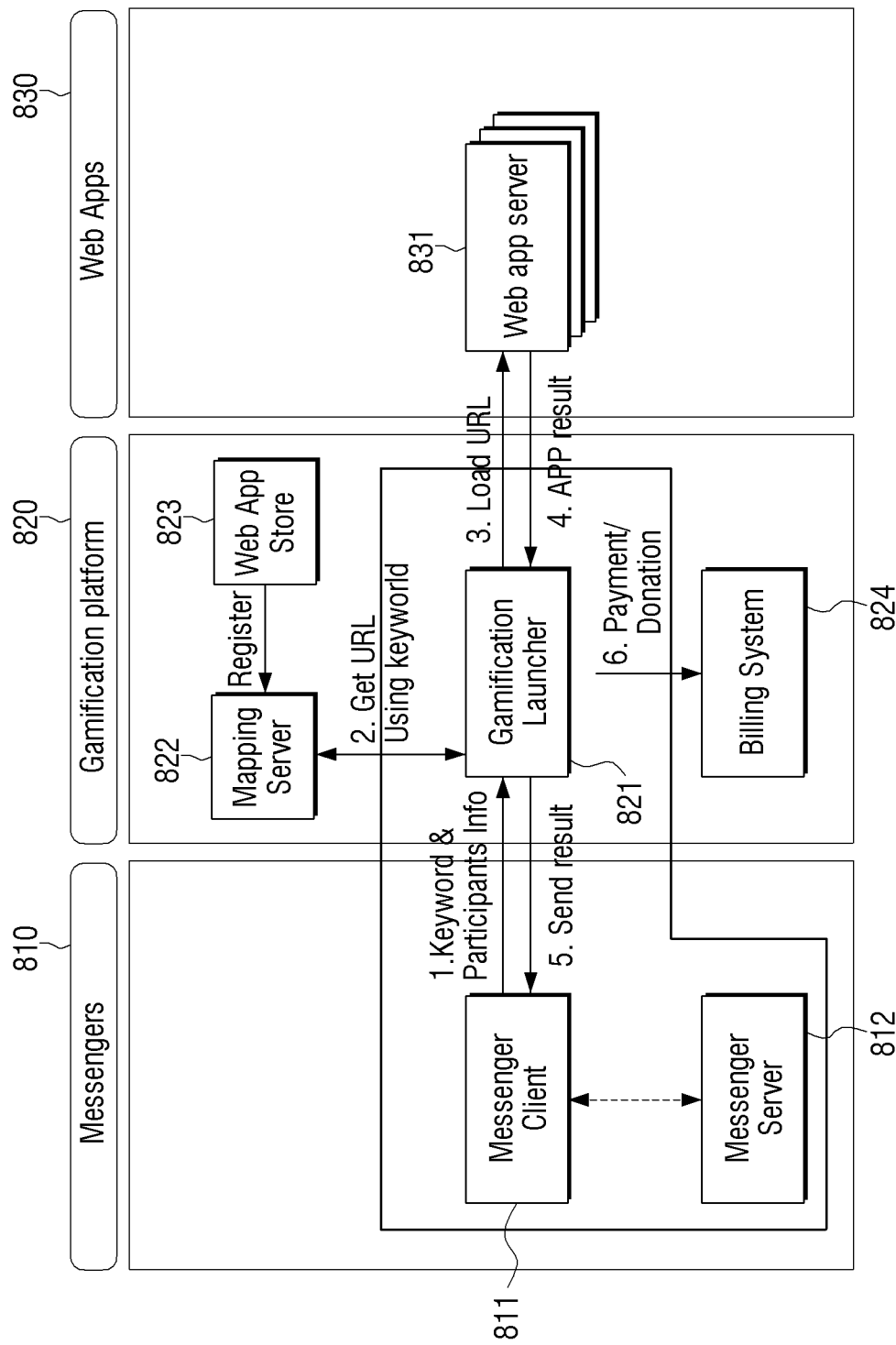
FIG. 8 is a diagram of a system according to an exemplary embodiment.

FIG. 8 is a diagram of a system according to an exemplary embodiment.

As illustrated in FIG. 8, the system may be classified into a messengers region 810, a gamification platform region 820, and a web apps region 830 which may be virtual regions for convenience of description. Gamification indicates inducement of user participation. Gamification is merely an arbitrary term, and does not necessarily indicate that a game to be played.

The messengers region 810 includes a messenger client 811 and a messenger server 812. The messenger client 811 may be an instant messenger installed in the user terminal apparatus 100, and the messenger server 812 may be the messenger service providing server 10.

The gamification platform region 820 includes a gamification launcher 821, a mapping server 822, a web app store 823, and a billing system 824. The gamification launcher 821 may be the aforementioned launcher, and the mapping server 822 and the web app store 823 may be the aforementioned app management server 200.

The web apps region 830 includes a web app server 831. Here, the web app server 831 may correspond to the app providing server 20.

According to an exemplary embodiment, in a state in which the messenger client 811 accesses the messenger server 812 to execute the chat window of the messenger service, keyword information of web app and participant information of the chat window may be provided to the gamification launcher 821 according to a user command input from the messenger client 811 (1). For example, when a user inputs an app keyword based on a specific identifier code (e.g., a special character such as @ or /) in the chat window, the corresponding keyword information and the participant information may be provided to the gamification launcher 821.

In this case, the gamification launcher 821 may acquire URL information of the corresponding web app from the mapping server 822 using the keyword information (2). However, according to another exemplary embodiment, an app list may be provided from the web app store 823, and URL information about web app selected on an app list may be acquired from the mapping server 822.

Then the gamification launcher 821 may load the acquired URL information and participant information to the web app server 831 (3) and receive app execution information from the web app server 831 (4).

Then the gamification launcher 821 may transmit the received app execution information to the messenger client 811 and provide a corresponding app execution image in the chat window (5). In this case, the messenger client 811 may request icon information from the gamification launcher 821, may receive the requested icon information to display the icon in the chat window, and may execute the app according to a user command for selection of an app icon in the chat window and display an app execution image. In addition, the messenger client 811 may automatically execute app immediately after receiving the app execution information and display an app execution image.

The billing system 824 may be used for sending and receiving payments and donations for the app (6).

Figure 9:
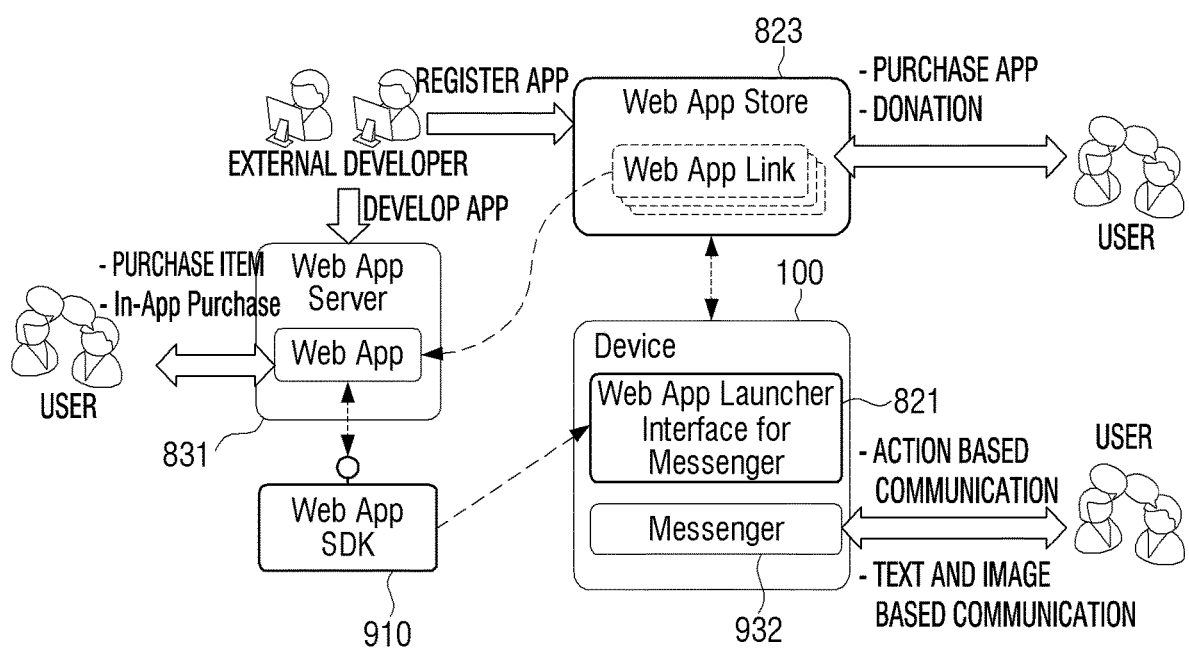
FIG. 9 is a diagram for explaining a process of developing and registering a web app according to an exemplary embodiment.

FIG. 9 is a diagram for explaining a process of developing and registering web app according to an exemplary embodiment.

Referring to FIG. 9, when a developer develops a web app, the web app server 831 may store and manage a resource and/or a source code and register web app information in the web app store 823. The web app store 823 may store and manage web app information, for example, an app execution command, an app icon, a description, URL, and so on. The web app store 823 may provide web app information such as a web icon and a description to a user such that the user may purchase the app based on the web app information provided from the web app store 823. The user may purchase an item for the web app through the web app server 831.

A web app developer may develop web app using a software development kit (SDK) for receiving information of participants in the chat window of the messenger service, irrespective of a messenger type.

Figure 10:
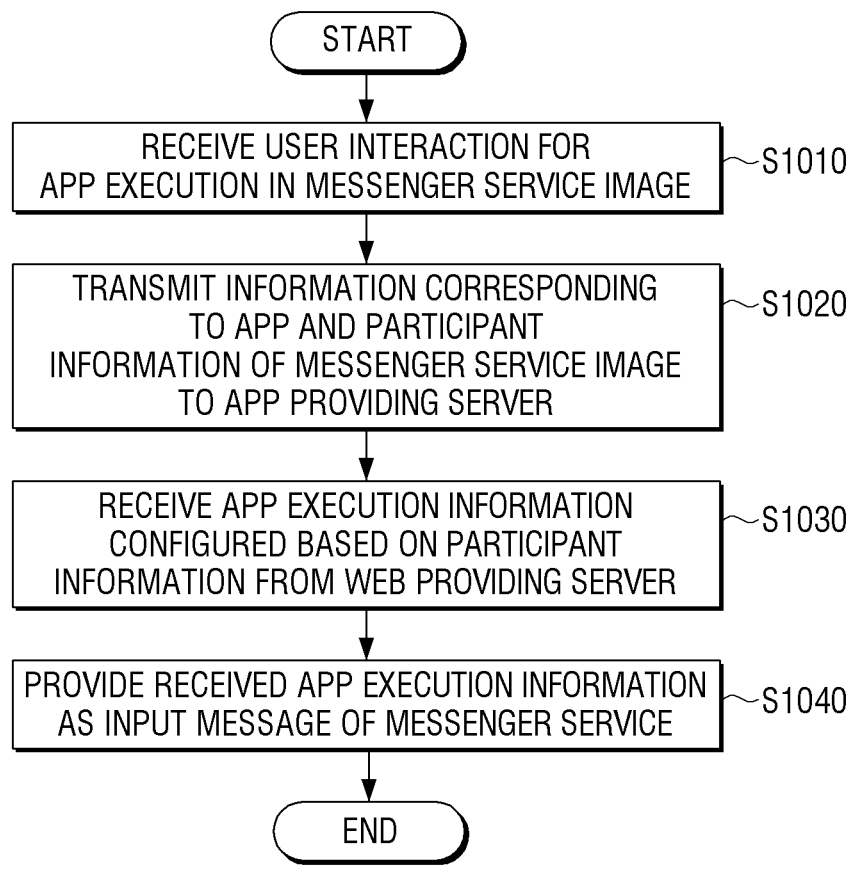
FIG. 10 is a flowchart for explaining a method of controlling a user terminal apparatus according to an exemplary embodiment.

FIG. 10 is a flowchart for explaining a method of controlling a user terminal apparatus according to an exemplary embodiment.

In the method of controlling the user terminal apparatus illustrated in FIG. 10, first, a messenger service image is displayed according to an execution of a messenger client (S1010).

Then, in response to a user interaction for app execution being received in the messenger service image, identifier information of the corresponding app and participant information of the messenger service image are transmitted to an app providing server (S1020).

Then, app execution information configured based on participant information may be received from the app providing server (S1030) and may be provided as an input message of the messenger service (S1040).

In addition, the user terminal apparatus may receive an app list from an app management server and display the app list according to a preset event. In operation S1020, in response to a user command for selection of one app being selected from the app list, the user terminal apparatus may transmit identifier information of the corresponding app and participant information of the messenger service to the app providing server. Here, the preset event may be a user command for selection of a preset icon provided in the messenger service image.

The user terminal apparatus may communicate with the app providing server and the app management server using a pre-installed app launcher. The app management server may manage the URL information and execution command of an executable web app and the web providing server may manage the resource and code of the web app corresponding to the URL information.

The user command for app execution may be a selection of a specific app on the app list or a user command inputting a preset form of information for identification of the app in the chat window of the messenger service.

In operation S1030, an icon corresponding to the app may be provided in the chat window of the messenger service based on the received app execution information.

In addition, in response to the received app execution information being provided as an input message, the user terminal apparatus may automatically execute the app or may execute the app according to a user command selecting the provided icon in the chat window to display an app execution image.

The app execution information received from the app providing server may include app configuration information and app execution information, for configuring an app execution image and for receiving and applying real-time interaction by a participant of the messenger service image.

The user terminal apparatus may receive an app use result to which real-time interaction is applied by a participant of the messenger service image in an app execution image corresponding to the received app execution information from the web providing server, and may provide the app use result as an input message of the messenger service.

In addition, the method may further include displaying the app execution image over the messenger service image in response to the app being executed and restoring the messenger service image back to a previous image in response to the app execution being terminated.

As described above, according to various exemplary embodiments, an operable web app execution function may be provided irrespective of a messenger type and a mobile platform type (e.g., Android, iOS, Tizen, and so on), thereby reducing development and maintenance costs for web app developers. In addition, a messenger service and a web app service may be provided in conjunction with each other, and the web app is not necessarily downloaded and installed, thereby enhancing user convenience.

The aforementioned methods of controlling a user terminal apparatus according to various exemplary embodiments may be embodied as a program and provided to a user terminal apparatus.

For example, there may be provided a non-transitory computer readable medium for storing a program for performing a function of transmitting identifier information of an app and participant information of the messenger service image to an app providing server in response to user interaction for app execution being received in the messenger service image, receiving app execution information configured based on the participant information from the app providing server, and providing the app execution information as an input message of the messenger service may be provided to a user terminal apparatus.

The non-transitory computer readable media refers to a medium that semi-permanently stores data and is readable by a device instead of a medium that stores data for a short time, such as a register, a cache, a memory, etc. For example, the aforementioned programs may be stored and provided in the non-transitory computer readable media such as a compact disk (CD), a digital versatile disk (DVD), a hard disc, a Blu-ray disc, a universal serial bus (USB) drive, a memory card, ROM, etc.

The foregoing exemplary embodiments and advantages are merely exemplary and are not to be construed as limiting. Also, the description of the exemplary embodiments is intended to be illustrative, and not to limit the scope of the claims and their equivalents, and many alternatives, modifications, and variations will be apparent to those skilled in the art.

What is claimed is:

1. A user terminal apparatus comprising:
a display;
a user interface; and
a processor configured to:
control the display to provide a messenger service screen,
based on a user command selecting an application, request information on the selected application to an application management server, and receive identifier information including Uniform Resource Locator (URL) information corresponding to the selected application,
control to transmit, based on a user command received by the user interface for execution of the application, the identifier information corresponding to the application and participant information corresponding to participants of a messenger service to an application providing server,
based on application execution information received based on the participant information from the application providing server, provide the application execution information as an input message of the messenger service,
execute the application through a web based on the application execution information,
control the display to provide, on a chat window of the messenger service, an application screen with the participant information being applied thereto, based on the application being executed, and
based on receiving an application use result corresponding to the executed application, provide the application use result as the input message of the messenger service, the application use result including the participant information,
wherein the participant information comprises a number of participants in the chat window and participant identifier information.

2. The user terminal apparatus as claimed in claim 1,
wherein the processor is further configured to control the user terminal apparatus to receive an application list from the application management server,
to control the display to display the application list based on a predetermined event, and to control the user terminal apparatus to transmit, based on the user command selecting the application from the application list, the identifier information corresponding to the application and the participant information to the application providing server.

3. The user terminal apparatus as claimed in claim 2,
wherein the processor is further configured to control the user terminal apparatus to communicate with the application providing server and the application management server through pre-installed application launcher software.

4. The user terminal apparatus as claimed in claim 2,
wherein the predetermined event comprises receiving a user command selecting a present item provided in the messenger service image.

5. The user terminal apparatus as claimed in claim 1,
wherein the user command for execution of the application comprises a user input of information identifying the application in the chat window of the messenger service.

6. The user terminal apparatus as claimed in claim 1,
wherein the processor is further configured to control the display to display an icon corresponding to the application in the chat window of the messenger service based on the received application execution information.

7. The user terminal apparatus as claimed in claim 6,
wherein the processor is further configured to automatically execute, based on the received application execution information being provided as the input message, the application.

8. The user terminal apparatus as claimed in claim 6,
wherein the processor is further configured to execute the application according to a user command selecting the icon provided in the chat window.

9. The user terminal apparatus as claimed in claim 1,
wherein the application execution information received from the application providing server comprises application configuration information for configuring an application execution image for receiving real-time interaction by a participant of the messenger service image.

10. The user terminal apparatus as claimed in claim 1,
wherein the processor is further configured to control, based on application being executed, the display to display an application execution image as the messenger service image, and to control, based on application being terminated, the display to restore the messenger service image to a previous image.

11. The user terminal apparatus as claimed in claim 2,
wherein:
the application comprises a web application,
the application management server manages the URL information and an execution command of the web application, and
the application providing server manages a resource and code of the web application corresponding to URL information.

12. A communication system comprising a user terminal apparatus and an application management server, comprising:
an application management server configured to manage information of a web application executable in a messenger service image of a messaging service; and
a user terminal apparatus configured to:
based on a user command selecting a web application, request information on the selected web application to the application management server, and receive identifier information including Uniform Resource Locator (URL) information corresponding to the selected web application,
based on a user command for execution of the web application, acquire information corresponding to the web application,
transmit the acquired information and participant information corresponding to participants of a messenger service to an application providing server,
based on application execution information received based on the participant information, provide the received application execution information as an input message of the messenger service,
execute the application through a web based on the application execution information, provide, on a chat window of the messenger service, an application screen with the participant information being applied thereto, based on the application being executed, based on receiving an application use result corresponding to the executed application, provide the application use result as the input message of the messenger service, the application use result including the participant information, wherein the participant information comprises a number of participants in the chat window and participant identifier information.

13. A method of controlling a user terminal apparatus, the method comprising:

displaying a messenger service image of a messenger service;

based on a user command selecting an application, requesting information on the selected application to an application management server, and receiving identifier information including Uniform Resource Locator (URL) information corresponding to the selected application, transmitting, based on a user command for execution of an application, the identifier information corresponding to the application and participant information corresponding to participants of the messenger service to an application providing server;

based on application execution information received based on the participant information from the application providing server, providing the application execution information as an input message of the messenger service;

executing the application through a web based on the application execution information;

displaying, on a chat window of the messenger service, an application screen with the participant information being applied thereto, based on the application being executed; and based on receiving an application use result corresponding to the executed application, providing the application use result as the input message of the messenger service, the application use result including the participant information, wherein the participant information comprises a number of participants in the chat window and participant identifier information.

14. The method as claimed in claim 13, further comprising:

receiving an application list from the application management server; and displaying the application list based on a predetermined event, wherein the transmitting comprises transmitting, based on the user command selecting the application from the application list, the identifier information corresponding to the one application and the participant information to the application providing server.

15. The method as claimed in claim 14, wherein the user terminal apparatus communicates with the application providing server and the application management server through pre-installed application launcher software.

16. The method as claimed in claim 14, wherein the predetermined event comprises an event of receiving a user command selecting a present item provided in the messenger service image.

17. The method as claimed in claim 13, wherein the user command for execution of the application comprises a user input of information identifying the application in the chat window of the messenger service.

18. The method as claimed in claim 13, further comprising providing an icon corresponding to the application in the chat window of the messenger service based on the received application execution information.

19. The method as claimed in claim 18, further comprising automatically executing, based on the received application execution information being provided as the input message, the application.

20. The method as claimed in claim 18, further comprising executing the application according to a user command selecting the icon provided in the chat window.

21. The method as claimed in claim 13, wherein the application execution information received from the application providing server comprises application configuration information for configuring an application execution image for receiving real-time interaction by a participant of the messenger service image.

22. A user terminal apparatus comprising:

a display;

a communicator; and a controller configured to:

execute a messenger service, control the display to display a messenger service image of the messenger service, based on a user command selecting a web application, request information on the selected web application to an application management server, and receive identifier information including Uniform Resource Locator (URL) information corresponding to the selected application, control the communicator to transmit identifier information corresponding to a web application and participant information corresponding to users of the messenger service to an application providing server, based on application execution information received based on the participant information from the application providing server, provide the application execution information as an input message to the messenger service, execute the application through a web based on the application execution information, control the display to provide, on a chat window of the messenger service, an application screen with the participant information being applied thereto, based on the application being executed, and based on receiving an application use result corresponding to the executed application, provide the application use result as the input message of the messenger service, the application use result including the participant information, wherein the participant information comprises a number of participants in the chat window and participant identifier information.

23. The user terminal apparatus as claimed in claim 22, wherein the controller is further configured to, based on the application execution information being provided as an input message to the messenger service, control the display to display an icon corresponding to the web application in the chat window of the messaging service image.

24. The user terminal apparatus as claimed in claim 22, wherein the controller is further configured to control the communicator to receive an application result corresponding to an execution of the web application, and to provide the application result as an input message of the messenger service.

25. The user terminal apparatus as claimed in claim 22, wherein the web application comprises an application requesting user input from the users of the messaging service.

26. The user terminal apparatus as claimed in claim 25, wherein the controller is further configured to control the communicator to receive an application result corresponding to the user input, and to provide the application result as an input message of the messenger service.

* * * * *